(12) United States Patent
Trefler et al.

(10) Patent No.: US 8,479,157 B2
(45) Date of Patent: *Jul. 2, 2013

(54) METHODS AND APPARATUS FOR INTEGRATION OF DECLARATIVE RULE-BASED PROCESSING WITH PROCEDURAL PROGRAMMING IN A DIGITAL DATA-PROCESSING EVIRONMENT

(75) Inventors: Alan Trefler, Brookline, MA (US);
Andreas G. Hofmann, Cambridge, MA (US)

(73) Assignee: Pegasystems Inc., Cambridge, MA (US)

( * ) Notice: Subject to any disclaimer, the term of this patent is extended or adjusted under 35 U.S.C. 154(b) by 658 days.

This patent is subject to a terminal disclaimer.

(21) Appl. No.: 12/649,095

(22) Filed: Dec. 29, 2009

(65) Prior Publication Data

US 2010/0107137 A1 Apr. 29, 2010

Related U.S. Application Data

(63) Continuation of application No. 10/854,017, filed on May 26, 2004, now Pat. No. 7,665,063.

(51) Int. Cl.
*G06F 9/44* (2006.01)

(52) U.S. Cl.
USPC ............................ 717/111; 717/112; 717/117

(58) Field of Classification Search
USPC .................................. 717/111, 112, 117, 118
See application file for complete search history.

(56) References Cited

U.S. PATENT DOCUMENTS

| | | |
|---|---|---|
| 4,047,059 A | 9/1977 | Rosenthal |
| 4,344,142 A | 8/1982 | Diehr, II et al. |

(Continued)

FOREIGN PATENT DOCUMENTS

| | | |
|---|---|---|
| DE | 19911098 A1 | 12/1999 |
| EP | 0 549 208 A2 | 6/1993 |

(Continued)

OTHER PUBLICATIONS

Brusilovsky, P., and De Bra, P., Editors, "Second Workshop on Adaptive Hypertext and Hypermedia Proceedings," Jun. 20-24, 1998. Ninth ACM Conference on Hypertext and Hypermedia, Hypertext'98. pp. 1-2.

(Continued)

*Primary Examiner* — Phillip H Nguyen
(74) *Attorney, Agent, or Firm* — Nutter McClennen & Fish LLP; David J. Powsner

(57) ABSTRACT

The present invention provides methods and systems for integrating a procedural computational model with a declarative computational model. For example, in one aspect, the present invention provides a method for integrating a plurality of procedural instructions in a procedural computational system with a plurality of declarative rules in a declarative computational system. In such a method, for each of the procedural instructions operating on one or more variables, a hash table indexed by variable names is utilized to determine whether any of these variables participate in at least one of the declarative rules. Upon execution of a procedural instruction that changes a variable participating in a declarative rule, other variables associated with the rule are updated so as to maintain a relationship imposed by the rule among the variables. The updating of the other variables is performed prior to execution of other procedural instructions. Further, for each of the updated values, changes associated with to updated variable are propagated to other rules, if any, in which the updated variable participates. The propagation of the change can be accomplished by modifying values of variables other than the updated variable so as to maintain relationships defined by these other rules. The integrated computational systems of the invention can find applications, for example, in workflow processing.

31 Claims, 9 Drawing Sheets

System Architecture

U.S. PATENT DOCUMENTS

| | | |
|---|---|---|
| 4,602,168 A | 7/1986 | Single |
| 4,607,232 A | 8/1986 | Gill, Jr. |
| 4,659,944 A | 4/1987 | Miller, Sr. et al. |
| 4,701,130 A | 10/1987 | Whitney et al. |
| 4,866,634 A | 9/1989 | Reboh et al. |
| 4,884,217 A | 11/1989 | Skeirik et al. |
| 4,895,518 A | 1/1990 | Arnold et al. |
| 4,930,071 A | 5/1990 | Tou et al. |
| 4,953,106 A | 8/1990 | Gansner et al. |
| 5,077,491 A | 12/1991 | Heck et al. |
| 5,093,794 A | 3/1992 | Howie et al. |
| 5,119,465 A | 6/1992 | Jack et al. |
| 5,129,043 A | 7/1992 | Yue |
| 5,136,184 A | 8/1992 | Deevy |
| 5,136,523 A | 8/1992 | Landers |
| 5,140,671 A * | 8/1992 | Hayes et al. .................... 706/60 |
| 5,193,056 A | 3/1993 | Boes |
| 5,199,068 A | 3/1993 | Cox |
| 5,204,939 A | 4/1993 | Yamazaki et al. |
| 5,228,116 A | 7/1993 | Harris et al. |
| 5,259,766 A | 11/1993 | Sack et al. |
| 5,262,941 A | 11/1993 | Saladin et al. |
| 5,267,175 A | 11/1993 | Hooper |
| 5,267,865 A | 12/1993 | Lee et al. |
| 5,270,920 A | 12/1993 | Pearse et al. |
| 5,276,359 A | 1/1994 | Chiang |
| 5,276,885 A | 1/1994 | Milnes et al. |
| 5,291,394 A | 3/1994 | Chapman |
| 5,291,583 A | 3/1994 | Bapat |
| 5,295,256 A | 3/1994 | Bapat |
| 5,297,279 A | 3/1994 | Bannon et al. |
| 5,301,270 A | 4/1994 | Steinberg et al. |
| 5,310,349 A | 5/1994 | Daniels et al. |
| 5,311,422 A | 5/1994 | Loftin et al. |
| 5,326,270 A | 7/1994 | Ostby et al. |
| 5,333,254 A | 7/1994 | Robertson |
| 5,339,390 A | 8/1994 | Robertson et al. |
| 5,374,932 A | 12/1994 | Wyschogrod et al. |
| 5,379,366 A | 1/1995 | Noyes |
| 5,379,387 A | 1/1995 | Carlstedt et al. |
| 5,381,332 A | 1/1995 | Wood |
| 5,386,559 A | 1/1995 | Eisenberg et al. |
| 5,395,243 A | 3/1995 | Lubin et al. |
| 5,412,756 A * | 5/1995 | Bauman et al. ................ 706/45 |
| 5,421,011 A | 5/1995 | Camillone et al. |
| 5,421,730 A | 6/1995 | Lasker, III et al. |
| 5,446,397 A | 8/1995 | Yotsuyanagi |
| 5,446,885 A | 8/1995 | Moore et al. |
| 5,450,480 A | 9/1995 | Man et al. |
| 5,463,682 A | 10/1995 | Fisher et al. |
| 5,473,732 A | 12/1995 | Chang |
| 5,477,170 A | 12/1995 | Yotsuyanagi |
| 5,481,647 A | 1/1996 | Brody et al. |
| 5,499,293 A | 3/1996 | Behram et al. |
| 5,504,879 A | 4/1996 | Eisenberg et al. |
| 5,512,849 A | 4/1996 | Wong |
| 5,519,618 A | 5/1996 | Kastner et al. |
| 5,537,590 A | 7/1996 | Amado |
| 5,542,024 A | 7/1996 | Balint et al. |
| 5,542,078 A | 7/1996 | Martel et al. |
| 5,548,506 A | 8/1996 | Srinivasan |
| 5,561,740 A | 10/1996 | Barrett et al. |
| 5,579,223 A | 11/1996 | Raman |
| 5,579,486 A | 11/1996 | Oprescu et al. |
| 5,596,752 A | 1/1997 | Knudsen et al. |
| 5,597,312 A | 1/1997 | Bloom et al. |
| 5,608,789 A | 3/1997 | Fisher et al. |
| 5,627,979 A | 5/1997 | Chang et al. |
| 5,630,127 A | 5/1997 | Moore et al. |
| 5,649,192 A | 7/1997 | Stucky |
| 5,655,118 A | 8/1997 | Heindel et al. |
| 5,664,206 A | 9/1997 | Murow et al. |
| 5,678,039 A | 10/1997 | Hinks et al. |
| 5,715,450 A | 2/1998 | Ambrose et al. |
| 5,732,192 A | 3/1998 | Malin et al. |
| 5,754,740 A * | 5/1998 | Fukuoka et al. ................ 706/58 |
| 5,761,063 A | 6/1998 | Jannette et al. |
| 5,761,673 A | 6/1998 | Bookman et al. |
| 5,765,140 A | 6/1998 | Knudson et al. |
| 5,768,480 A | 6/1998 | Crawford, Jr. et al. |
| 5,788,504 A | 8/1998 | Rice et al. |
| 5,795,155 A | 8/1998 | Morrel-Samuels |
| 5,809,212 A | 9/1998 | Shasha |
| 5,815,415 A | 9/1998 | Bentley et al. |
| 5,819,257 A | 10/1998 | Monge et al. |
| 5,822,780 A | 10/1998 | Schutzman |
| 5,825,260 A | 10/1998 | Ludwig et al. |
| 5,826,077 A | 10/1998 | Blakeley et al. |
| 5,826,239 A | 10/1998 | Du et al. |
| 5,826,250 A | 10/1998 | Trefler |
| 5,826,252 A | 10/1998 | Wolters, Jr. et al. |
| 5,829,983 A | 11/1998 | Koyama et al. |
| 5,832,483 A | 11/1998 | Barker |
| 5,841,673 A | 11/1998 | Kobayashi et al. |
| 5,873,096 A | 2/1999 | Lim et al. |
| 5,875,334 A | 2/1999 | Chow et al. |
| 5,875,441 A | 2/1999 | Nakatsuyama et al. |
| 5,880,614 A | 3/1999 | Zinke et al. |
| 5,880,742 A | 3/1999 | Rao et al. |
| 5,886,546 A | 3/1999 | Hwang |
| 5,890,146 A | 3/1999 | Wavish et al. |
| 5,890,166 A | 3/1999 | Eisenberg et al. |
| 5,907,490 A | 5/1999 | Oliver |
| 5,907,837 A | 5/1999 | Ferrel et al. |
| 5,910,748 A | 6/1999 | Reffay et al. |
| 5,918,222 A | 6/1999 | Fukui et al. |
| 5,920,717 A | 7/1999 | Noda |
| 5,930,795 A | 7/1999 | Chen et al. |
| 5,945,852 A | 8/1999 | Kosiec |
| 5,974,441 A | 10/1999 | Rogers et al. |
| 5,974,443 A | 10/1999 | Jeske |
| 5,978,566 A | 11/1999 | Plank et al. |
| 5,983,267 A | 11/1999 | Shklar et al. |
| 5,987,415 A | 11/1999 | Breese et al. |
| 5,990,742 A | 11/1999 | Suzuki |
| 5,995,948 A | 11/1999 | Whitford et al. |
| 5,995,958 A | 11/1999 | Xu |
| 6,008,673 A | 12/1999 | Glass et al. |
| 6,012,098 A | 1/2000 | Bayeh et al. |
| 6,020,768 A | 2/2000 | Lim |
| 6,023,704 A | 2/2000 | Gerard et al. |
| 6,023,714 A | 2/2000 | Hill et al. |
| 6,023,717 A | 2/2000 | Argyroudis |
| 6,028,457 A | 2/2000 | Tihanyi |
| 6,037,890 A | 3/2000 | Glass et al. |
| 6,044,373 A | 3/2000 | Gladney et al. |
| 6,044,466 A | 3/2000 | Anand et al. |
| 6,078,982 A | 6/2000 | Du et al. |
| 6,085,188 A | 7/2000 | Bachmann et al. |
| 6,085,198 A | 7/2000 | Skinner et al. |
| 6,091,226 A | 7/2000 | Amano |
| 6,092,036 A | 7/2000 | Hamann |
| 6,092,083 A | 7/2000 | Brodersen et al. |
| 6,094,652 A | 7/2000 | Faisal |
| 6,105,035 A | 8/2000 | Monge et al. |
| 6,122,632 A | 9/2000 | Botts et al. |
| 6,125,363 A | 9/2000 | Buzzeo et al. |
| 6,130,679 A | 10/2000 | Chen et al. |
| 6,137,797 A | 10/2000 | Bass et al. |
| 6,144,997 A | 11/2000 | Lamming et al. |
| 6,151,595 A | 11/2000 | Pirolli et al. |
| 6,151,624 A | 11/2000 | Teare et al. |
| 6,154,738 A | 11/2000 | Call |
| 6,167,441 A | 12/2000 | Himmel |
| 6,177,932 B1 | 1/2001 | Galdes et al. |
| 6,185,516 B1 | 2/2001 | Hardin et al. |
| 6,185,534 B1 | 2/2001 | Breese et al. |
| 6,192,371 B1 | 2/2001 | Schultz |
| 6,194,919 B1 | 2/2001 | Park |
| 6,212,502 B1 | 4/2001 | Ball et al. |
| 6,216,135 B1 | 4/2001 | Brodersen et al. |
| 6,233,617 B1 | 5/2001 | Rothwein et al. |
| 6,240,417 B1 | 5/2001 | Eastwick et al. |
| 6,243,713 B1 | 6/2001 | Nelson et al. |
| 6,246,320 B1 | 6/2001 | Monroe |
| 6,275,073 B1 | 8/2001 | Tokuhiro |
| 6,275,790 B1 | 8/2001 | Yamamoto et al. |

| | | |
|---|---|---|
| 6,300,947 B1 | 10/2001 | Kanevsky |
| 6,308,163 B1 | 10/2001 | Du et al. |
| 6,314,415 B1 | 11/2001 | Mukherjee |
| 6,324,693 B1 | 11/2001 | Brodersen et al. |
| 6,330,554 B1 | 12/2001 | Altschuler et al. |
| 6,338,074 B1 | 1/2002 | Poindexter et al. |
| 6,341,277 B1 | 1/2002 | Coden et al. |
| 6,341,293 B1 | 1/2002 | Hennessey |
| 6,349,238 B1 | 2/2002 | Gabbita et al. |
| 6,351,734 B1 | 2/2002 | Lautzenheiser et al. |
| 6,359,633 B1 | 3/2002 | Balasubramaniam et al. |
| 6,369,819 B1 | 4/2002 | Pitkow et al. |
| 6,380,910 B1 | 4/2002 | Moustakas et al. |
| 6,381,738 B1 | 4/2002 | Choi et al. |
| 6,389,460 B1 | 5/2002 | Stewart et al. |
| 6,393,605 B1 | 5/2002 | Loomans |
| 6,396,885 B1 | 5/2002 | Ding et al. |
| 6,405,211 B1 | 6/2002 | Sokol et al. |
| 6,405,251 B1 | 6/2002 | Bullard et al. |
| 6,415,259 B1 | 7/2002 | Wolfinger et al. |
| 6,415,283 B1 | 7/2002 | Conklin |
| 6,418,448 B1 | 7/2002 | Sarkar |
| 6,426,723 B1 | 7/2002 | Smith et al. |
| 6,429,870 B1 | 8/2002 | Chen et al. |
| 6,437,799 B1 | 8/2002 | Shinomi |
| 6,446,089 B1 | 9/2002 | Brodersen et al. |
| 6,446,200 B1 | 9/2002 | Ball et al. |
| 6,446,256 B1 | 9/2002 | Hyman et al. |
| 6,448,964 B1 | 9/2002 | Isaacs et al. |
| 6,463,440 B1 | 10/2002 | Hind et al. |
| 6,473,467 B1 | 10/2002 | Wallace et al. |
| 6,473,748 B1 | 10/2002 | Archer |
| 6,493,331 B1 | 12/2002 | Walton et al. |
| 6,493,399 B1 | 12/2002 | Xia et al. |
| 6,493,754 B1 | 12/2002 | Rosborough et al. |
| 6,496,812 B1 | 12/2002 | Campaigne et al. |
| 6,496,833 B1 | 12/2002 | Goldberg et al. |
| 6,502,239 B2 | 12/2002 | Zgarba et al. |
| 6,509,898 B2 | 1/2003 | Chi et al. |
| 6,513,018 B1 | 1/2003 | Culhane |
| 6,526,440 B1 | 2/2003 | Bharat |
| 6,526,457 B1 | 2/2003 | Birze |
| 6,529,899 B1 | 3/2003 | Kraft et al. |
| 6,530,079 B1 | 3/2003 | Choi et al. |
| 6,539,374 B2 | 3/2003 | Jung |
| 6,542,912 B2 | 4/2003 | Meltzer et al. |
| 6,546,406 B1 | 4/2003 | DeRose et al. |
| 6,549,904 B1 | 4/2003 | Ortega et al. |
| 6,556,983 B1 | 4/2003 | Altschuler et al. |
| 6,556,985 B1 | 4/2003 | Karch |
| 6,560,592 B1 | 5/2003 | Reid et al. |
| 6,567,419 B1 | 5/2003 | Yarlagadda |
| 6,571,222 B1 | 5/2003 | Matsumoto et al. |
| 6,577,769 B1 | 6/2003 | Kenyon et al. |
| 6,583,800 B1 | 6/2003 | Ridgley et al. |
| 6,584,464 B1 | 6/2003 | Warthen |
| 6,584,569 B2 | 6/2003 | Reshef et al. |
| 6,594,662 B1 | 7/2003 | Sieffert et al. |
| 6,597,775 B2 | 7/2003 | Lawyer et al. |
| 6,598,043 B1 | 7/2003 | Baclawski |
| 6,606,613 B1 | 8/2003 | Altschuler et al. |
| 6,625,657 B1 | 9/2003 | Bullard |
| 6,629,138 B1 | 9/2003 | Lambert et al. |
| 6,636,850 B2 | 10/2003 | Lepien |
| 6,636,901 B2 | 10/2003 | Sudhakaran et al. |
| 6,643,638 B1 | 11/2003 | Xu |
| 6,643,652 B2 | 11/2003 | Helgeson et al. |
| 6,661,908 B1 | 12/2003 | Suchard et al. |
| 6,678,679 B1 | 1/2004 | Bradford |
| 6,678,773 B2 | 1/2004 | Marietta et al. |
| 6,678,882 B1 | 1/2004 | Hurley et al. |
| 6,684,261 B1 | 1/2004 | Orton et al. |
| 6,691,230 B1 | 2/2004 | Bardon |
| 6,701,314 B1 | 3/2004 | Conover et al. |
| 6,711,565 B1 | 3/2004 | Subramaniam et al. |
| 6,721,747 B2 | 4/2004 | Lipkin |
| 6,728,702 B1 | 4/2004 | Subramaniam et al. |
| 6,728,852 B1 | 4/2004 | Stoutamire |
| 6,732,095 B1 | 5/2004 | Warshavsky et al. |
| 6,732,111 B2 | 5/2004 | Brodersen et al. |
| 6,748,422 B2 | 6/2004 | Morin et al. |
| 6,750,858 B1 | 6/2004 | Rosenstein |
| 6,751,663 B1 | 6/2004 | Farrell et al. |
| 6,754,475 B1 | 6/2004 | Harrison et al. |
| 6,756,994 B1 | 6/2004 | Tlaskal et al. |
| 6,763,351 B1 | 7/2004 | Subramaniam et al. |
| 6,771,706 B2 | 8/2004 | Ling et al. |
| 6,772,148 B2 | 8/2004 | Baclawski |
| 6,772,350 B1 | 8/2004 | Belani et al. |
| 6,778,971 B1 | 8/2004 | Altschuler et al. |
| 6,782,091 B1 | 8/2004 | Dunning, III |
| 6,785,341 B2 | 8/2004 | Walton et al. |
| 6,788,114 B1 | 9/2004 | Krenzke et al. |
| 6,792,420 B2 | 9/2004 | Chen et al. |
| RE38,633 E | 10/2004 | Srinivasan |
| 6,804,330 B1 | 10/2004 | Jones et al. |
| 6,820,082 B1 | 11/2004 | Cook et al. |
| 6,829,655 B1 | 12/2004 | Huang et al. |
| 6,831,668 B2 | 12/2004 | Cras et al. |
| 6,839,682 B1 | 1/2005 | Blume et al. |
| 6,847,982 B2 | 1/2005 | Parker et al. |
| 6,851,089 B1 | 2/2005 | Erickson et al. |
| 6,856,575 B2 | 2/2005 | Jones et al. |
| 6,856,992 B2 | 2/2005 | Britton et al. |
| 6,859,787 B2 | 2/2005 | Fisher et al. |
| 6,865,546 B1 | 3/2005 | Song |
| 6,865,566 B2 | 3/2005 | Serrano-Morales et al. |
| 6,865,575 B1 | 3/2005 | Smith et al. |
| 6,867,789 B1 | 3/2005 | Allen et al. |
| 6,918,222 B2 | 7/2005 | Lat et al. |
| 6,920,615 B1 | 7/2005 | Campbell et al. |
| 6,925,457 B2 | 8/2005 | Britton et al. |
| 6,927,728 B2 | 8/2005 | Vook et al. |
| 6,934,702 B2 | 8/2005 | Faybishenko et al. |
| 6,940,917 B2 | 9/2005 | Menon et al. |
| 6,944,644 B2 | 9/2005 | Gideon |
| 6,954,737 B2 | 10/2005 | Kalantar et al. |
| 6,956,845 B2 | 10/2005 | Baker et al. |
| 6,959,432 B2 | 10/2005 | Crocker et al. |
| 6,961,725 B2 | 11/2005 | Yuan et al. |
| 6,965,889 B2 | 11/2005 | Serrano-Morales et al. |
| 6,976,144 B1 | 12/2005 | Trefler et al. |
| 6,985,912 B2 | 1/2006 | Mullins et al. |
| 7,020,869 B2 | 3/2006 | Abrari et al. |
| 7,028,225 B2 | 4/2006 | Maso et al. |
| 7,031,901 B2 | 4/2006 | Abu El Ata |
| 7,058,367 B1 | 6/2006 | Luo et al. |
| 7,058,637 B2 | 6/2006 | Britton et al. |
| 7,064,766 B2 * | 6/2006 | Beda et al. .................... 345/557 |
| 7,076,558 B1 | 7/2006 | Dunn |
| 7,089,193 B2 | 8/2006 | Newbold |
| 7,103,173 B2 | 9/2006 | Rodenbusch et al. |
| 7,124,145 B2 | 10/2006 | Surasinghe |
| 7,139,999 B2 | 11/2006 | Bowman-Amuah |
| 7,143,116 B2 | 11/2006 | Okitsu et al. |
| 7,171,145 B2 | 1/2007 | Takeuchi et al. |
| 7,171,415 B2 | 1/2007 | Kan et al. |
| 7,174,514 B2 | 2/2007 | Subramaniam et al. |
| 7,289,793 B2 | 10/2007 | Norwood et al. |
| RE39,918 E | 11/2007 | Slemmer |
| 7,302,417 B2 * | 11/2007 | Iyer ................ 706/19 |
| 7,318,020 B1 | 1/2008 | Kim |
| 7,318,066 B2 | 1/2008 | Kaufman et al. |
| 7,334,039 B1 | 2/2008 | Majkut et al. |
| 7,353,229 B2 | 4/2008 | Vilcauskas, Jr. et al. |
| 7,406,475 B2 * | 7/2008 | Dorne et al. ............. 705/7.12 |
| 7,412,388 B2 | 8/2008 | Dalal et al. |
| 7,505,827 B1 | 3/2009 | Boddy et al. |
| 7,536,294 B1 | 5/2009 | Stanz et al. |
| 7,555,645 B2 | 6/2009 | Vissapragada |
| 7,574,494 B1 | 8/2009 | Mayernick et al. |
| 7,596,504 B2 | 9/2009 | Hughes et al. |
| 7,640,222 B2 | 12/2009 | Trefler |
| 7,665,063 B1 | 2/2010 | Hofmann et al. |
| 7,711,919 B2 | 5/2010 | Trefler et al. |
| 7,779,395 B1 * | 8/2010 | Chotin et al. ............ 717/137 |
| 7,844,594 B1 | 11/2010 | Holt et al. |
| 7,983,895 B2 | 7/2011 | McEntee et al. |

| | | |
|---|---|---|
| 8,037,329 B2 | 10/2011 | Leech et al. |
| 8,073,802 B2 | 12/2011 | Trefler |
| 8,250,525 B2 | 8/2012 | Khatutsky |
| 2001/0013799 A1 | 8/2001 | Wang |
| 2001/0035777 A1 | 11/2001 | Wang et al. |
| 2001/0047355 A1 | 11/2001 | Anwar |
| 2001/0049682 A1 | 12/2001 | Vincent et al. |
| 2001/0052108 A1 | 12/2001 | Bowman-Amuah |
| 2002/0010855 A1 | 1/2002 | Reshef et al. |
| 2002/0013804 A1 | 1/2002 | Gideon |
| 2002/0029161 A1 | 3/2002 | Brodersen et al. |
| 2002/0042831 A1 | 4/2002 | Capone et al. |
| 2002/0049603 A1 | 4/2002 | Mehra et al. |
| 2002/0049715 A1 | 4/2002 | Serrano-Morales et al. |
| 2002/0049788 A1 | 4/2002 | Lipkin et al. |
| 2002/0054152 A1 | 5/2002 | Palaniappan et al. |
| 2002/0059566 A1 | 5/2002 | Delcambre et al. |
| 2002/0091677 A1 | 7/2002 | Sridhar |
| 2002/0091678 A1 | 7/2002 | Miller et al. |
| 2002/0091710 A1 | 7/2002 | Dunham et al. |
| 2002/0091835 A1 | 7/2002 | Lentini et al. |
| 2002/0107684 A1 | 8/2002 | Gao |
| 2002/0118688 A1 | 8/2002 | Jagannathan |
| 2002/0120598 A1 | 8/2002 | Shadmon et al. |
| 2002/0120762 A1 | 8/2002 | Cheng et al. |
| 2002/0133502 A1 | 9/2002 | Rosenthal et al. |
| 2002/0177232 A1 | 11/2002 | Melker et al. |
| 2002/0178232 A1 | 11/2002 | Ferguson |
| 2002/0184610 A1 | 12/2002 | Chong et al. |
| 2003/0004934 A1 | 1/2003 | Qian |
| 2003/0004951 A1 | 1/2003 | Chokshi |
| 2003/0009239 A1 | 1/2003 | Lombardo et al. |
| 2003/0014399 A1 | 1/2003 | Hansen et al. |
| 2003/0037145 A1 | 2/2003 | Fagan |
| 2003/0050834 A1 | 3/2003 | Caplan |
| 2003/0050927 A1 | 3/2003 | Hussam |
| 2003/0050929 A1 | 3/2003 | Bookman et al. |
| 2003/0061209 A1 | 3/2003 | Raboczi et al. |
| 2003/0065544 A1 | 4/2003 | Elzinga et al. |
| 2003/0066031 A1 | 4/2003 | Laane |
| 2003/0074352 A1 | 4/2003 | Raboczi et al. |
| 2003/0074369 A1 | 4/2003 | Schuetze et al. |
| 2003/0084401 A1 | 5/2003 | Abel et al. |
| 2003/0109951 A1 | 6/2003 | Hsiung et al. |
| 2003/0135358 A1 | 7/2003 | Lissauer et al. |
| 2003/0191626 A1 | 10/2003 | Al-Onaizan et al. |
| 2003/0200254 A1 | 10/2003 | Wei |
| 2003/0200371 A1 | 10/2003 | Abujbara |
| 2003/0202617 A1 | 10/2003 | Casper |
| 2003/0222680 A1 | 12/2003 | Jaussi |
| 2003/0229529 A1 | 12/2003 | Mui et al. |
| 2003/0229544 A1 | 12/2003 | Veres et al. |
| 2004/0024603 A1 | 2/2004 | Mahoney et al. |
| 2004/0034651 A1 | 2/2004 | Gupta et al. |
| 2004/0049509 A1 | 3/2004 | Keller et al. |
| 2004/0054610 A1 | 3/2004 | Amstutz et al. |
| 2004/0088199 A1 | 5/2004 | Childress et al. |
| 2004/0103014 A1 | 5/2004 | Teegan et al. |
| 2004/0117759 A1 | 6/2004 | Rippert et al. |
| 2004/0122652 A1 | 6/2004 | Andrews et al. |
| 2004/0133416 A1 | 7/2004 | Fukuoka et al. |
| 2004/0133876 A1 | 7/2004 | Sproule |
| 2004/0162822 A1 | 8/2004 | Papanyan et al. |
| 2004/0167765 A1 | 8/2004 | Abu El Ata |
| 2004/0205672 A1 | 10/2004 | Bates et al. |
| 2004/0220792 A1 | 11/2004 | Gallanis et al. |
| 2004/0236566 A1 | 11/2004 | Simske |
| 2004/0268221 A1 | 12/2004 | Wang |
| 2004/0268299 A1 | 12/2004 | Lei et al. |
| 2005/0027563 A1 | 2/2005 | Fackler et al. |
| 2005/0039191 A1 | 2/2005 | Hewson et al. |
| 2005/0044198 A1 | 2/2005 | Okitsu et al. |
| 2005/0050000 A1 | 3/2005 | Kwok et al. |
| 2005/0055330 A1 | 3/2005 | Britton et al. |
| 2005/0059566 A1 | 3/2005 | Brown et al. |
| 2005/0060372 A1 | 3/2005 | DeBettencourt et al. |
| 2005/0104628 A1 | 5/2005 | Tanzawa et al. |
| 2005/0125683 A1 | 6/2005 | Matsuyama et al. |
| 2005/0165823 A1 | 7/2005 | Ondrusek et al. |
| 2005/0216235 A1 | 9/2005 | Butt et al. |
| 2005/0234882 A1 | 10/2005 | Bennett et al. |
| 2005/0288920 A1 | 12/2005 | Green et al. |
| 2006/0020783 A1 | 1/2006 | Fisher |
| 2006/0041861 A1 | 2/2006 | Trefler et al. |
| 2006/0063138 A1 | 3/2006 | Loff et al. |
| 2006/0064486 A1 | 3/2006 | Baron et al. |
| 2006/0080082 A1 | 4/2006 | Ravindra et al. |
| 2006/0100847 A1 | 5/2006 | McEntee et al. |
| 2006/0139312 A1 | 6/2006 | Sinclair et al. |
| 2006/0173724 A1 | 8/2006 | Trefler et al. |
| 2006/0173871 A1 | 8/2006 | Taniguchi et al. |
| 2006/0206303 A1 | 9/2006 | Kohlmeier et al. |
| 2006/0206305 A1 | 9/2006 | Kimura et al. |
| 2006/0218166 A1 | 9/2006 | Myers et al. |
| 2006/0271920 A1 | 11/2006 | Abouelsaadat |
| 2007/0010991 A1 | 1/2007 | Lei et al. |
| 2007/0028225 A1 | 2/2007 | Whittaker et al. |
| 2007/0038765 A1 | 2/2007 | Dunn |
| 2007/0055938 A1 | 3/2007 | Herring et al. |
| 2007/0061789 A1 | 3/2007 | Kaneko et al. |
| 2007/0094199 A1 | 4/2007 | Deshpande et al. |
| 2007/0118497 A1 | 5/2007 | Katoh |
| 2007/0130130 A1 | 6/2007 | Chan et al. |
| 2007/0136068 A1 | 6/2007 | Horvitz |
| 2007/0203756 A1 | 8/2007 | Sears et al. |
| 2007/0208553 A1 | 9/2007 | Hastings et al. |
| 2007/0233902 A1 | 10/2007 | Trefler et al. |
| 2007/0239646 A1 | 10/2007 | Trefler |
| 2007/0260584 A1 | 11/2007 | Marti et al. |
| 2007/0294644 A1 | 12/2007 | Yost |
| 2008/0046462 A1 | 2/2008 | Kaufman et al. |
| 2008/0077384 A1 | 3/2008 | Agapi et al. |
| 2008/0085502 A1 | 4/2008 | Allen et al. |
| 2008/0184230 A1 | 7/2008 | Leech et al. |
| 2008/0195377 A1 | 8/2008 | Kato et al. |
| 2008/0208785 A1 | 8/2008 | Trefler et al. |
| 2008/0216055 A1 | 9/2008 | Khatutsky |
| 2008/0216060 A1 | 9/2008 | Vargas |
| 2009/0075634 A1 | 3/2009 | Sinclair et al. |
| 2009/0132232 A1 | 5/2009 | Trefler |
| 2009/0158407 A1 | 6/2009 | Nicodemus et al. |
| 2009/0164494 A1 | 6/2009 | Dodin |
| 2009/0171938 A1 | 7/2009 | Levin et al. |
| 2009/0276206 A1 | 11/2009 | Fitzpatrick et al. |
| 2010/0088266 A1 | 4/2010 | Trefler |
| 2010/0107137 A1 | 4/2010 | Trefler et al. |
| 2013/0007267 A1 | 1/2013 | Khatutsky |

FOREIGN PATENT DOCUMENTS

| | | |
|---|---|---|
| EP | 0669717 A1 | 8/1995 |
| EP | 996916 A1 | 5/2000 |
| EP | 1015997 A2 | 7/2000 |
| EP | 1019807 A2 | 7/2000 |
| EP | 1073955 A1 | 2/2001 |
| EP | 1073992 A1 | 2/2001 |
| EP | 1135723 A1 | 9/2001 |
| EP | 1163604 A2 | 12/2001 |
| EP | 1183636 A1 | 3/2002 |
| EP | 1196882 A1 | 4/2002 |
| EP | 1203310 A1 | 5/2002 |
| EP | 1208482 A1 | 5/2002 |
| EP | 1212668 A2 | 6/2002 |
| EP | 1240592 A1 | 9/2002 |
| EP | 1277102 A2 | 1/2003 |
| EP | 1277119 A1 | 1/2003 |
| EP | 1277120 A1 | 1/2003 |
| EP | 1277153 A1 | 1/2003 |
| EP | 1277155 A1 | 1/2003 |
| EP | 1277329 A1 | 1/2003 |
| EP | 1374083 A1 | 1/2004 |
| EP | 1382030 A2 | 1/2004 |
| EP | 1386241 A1 | 2/2004 |
| EP | 1393172 A2 | 3/2004 |
| EP | 1393188 A1 | 3/2004 |
| EP | 1402336 A2 | 3/2004 |
| EP | 1407384 A1 | 4/2004 |
| EP | 1 430 396 A1 | 6/2004 |
| EP | 1438649 A1 | 7/2004 |

| | | | |
|---|---|---|---|
| EP | 1438654 A1 | 7/2004 | |
| EP | 1438672 A1 | 7/2004 | |
| EP | 1483685 A1 | 12/2004 | |
| EP | 1490747 A1 | 12/2004 | |
| EP | 1490809 A1 | 12/2004 | |
| EP | 1492232 A1 | 12/2004 | |
| EP | 1782183 A2 | 5/2007 | |
| EP | 1830312 | 9/2007 | |
| EP | 1840803 | 10/2007 | |
| EP | 2115581 A1 | 11/2009 | |
| WO | WO-9838564 A2 | 9/1998 | |
| WO | WO-9840807 A2 | 9/1998 | |
| WO | WO-9905632 A1 | 2/1999 | |
| WO | WO-9945465 A1 | 9/1999 | |
| WO | WO-9950784 A1 | 10/1999 | |
| WO | WO-0033187 A1 | 6/2000 | |
| WO | WO-0033217 A1 | 6/2000 | |
| WO | WO-0033226 A1 | 6/2000 | |
| WO | WO-0033235 A1 | 6/2000 | |
| WO | WO-0033238 A2 | 6/2000 | |
| WO | WO-0052553 A2 | 9/2000 | |
| WO | WO-0052603 A1 | 9/2000 | |
| WO | WO-0140958 A1 | 6/2001 | |
| WO | 0179994 | 10/2001 | |
| WO | WO-0175610 A1 | 10/2001 | |
| WO | WO-0175614 A1 | 10/2001 | |
| WO | WO-0175747 A1 | 10/2001 | |
| WO | WO-0175748 A1 | 10/2001 | |
| WO | WO-0176206 A1 | 10/2001 | |
| WO | WO-0177787 A2 | 10/2001 | |
| WO | WO-0221254 A2 | 3/2002 | |
| WO | 0244947 | 6/2002 | |
| WO | WO 02/056249 A2 * | 7/2002 | |
| WO | WO-02080006 A1 | 10/2002 | |
| WO | WO-02080015 A1 | 10/2002 | |
| WO | WO-02082300 A1 | 10/2002 | |
| WO | WO-02084925 A2 | 10/2002 | |
| WO | WO-02088869 A2 | 11/2002 | |
| WO | WO-02091346 A1 | 11/2002 | |
| WO | WO-02101517 A2 | 12/2002 | |
| WO | WO-02103576 A1 | 12/2002 | |
| WO | WO-03021393 A2 | 3/2003 | |
| WO | WO-03029923 A2 | 4/2003 | |
| WO | WO-03029955 A1 | 4/2003 | |
| WO | WO-03030005 A1 | 4/2003 | |
| WO | WO-03030013 | 4/2003 | |
| WO | WO-03030014 | 4/2003 | |
| WO | WO-03058504 | 7/2003 | |
| WO | WO-03069500 | 8/2003 | |
| WO | WO-03071380 | 8/2003 | |
| WO | WO-03071388 | 8/2003 | |
| WO | WO-03073319 | 9/2003 | |
| WO | WO-03077139 | 9/2003 | |
| WO | WO-03085503 | 10/2003 | |
| WO | WO-03085580 | 10/2003 | |
| WO | WO-2004001613 | 12/2003 | |
| WO | WO-2004003684 | 1/2004 | |
| WO | WO-2004003766 | 1/2004 | |
| WO | WO-2004003885 | 1/2004 | |
| WO | WO-2004046882 | 6/2004 | |
| WO | WO-2004061815 | 7/2004 | |
| WO | WO-2004086197 | 10/2004 | |
| WO | WO-2004086198 | 10/2004 | |
| WO | WO-2004095207 | 11/2004 | |
| WO | WO-2004095208 | 11/2004 | |
| WO | WO-2004114147 | 12/2004 | |
| WO | WO-2005001627 A2 | 1/2005 | |
| WO | WO-2005003888 | 1/2005 | |
| WO | 2005010645 | 2/2005 | |
| WO | 2005117549 | 12/2005 | |
| WO | WO-2006081536 A2 | 8/2006 | |
| WO | 2007/033922 A2 | 3/2007 | |
| WO | WO-2008109441 A1 | 9/2008 | |
| WO | WO-2009097384 A1 | 8/2009 | |

OTHER PUBLICATIONS

Buyya, Rajkumar et al., "Economic Models for Resource Management and Scheduling in Grid Computing," 2002. Concurrency and Computation: Practice and Experience. vol. 14. pp. 1507-1542.
Cheng, Cheng-Chung; Smith, Stephen F.; "A Constraint Satisfaction Approach to Makespan Scheduling," AIPS 1996 Proceedings, pp. 45-52 (1996).
Cheng and Smith, "Applying Constraint Satisfaction Techniques to Job Shop Scheduling," 1997. Annals of Operations Research. 70: 327-357 (1997).
FreeBSD Project. "EDQUOTA(8)" in Free BSD System Manager's Manual. FreeBSD 8.2 Jun. 6, 1993. pp. 1-2. Retrieved from freebsd.org on Oct. 27, 2011.
McConnell, Steven C., "Brooks' Law Repealed," IEEE Software, pp. 6-9, Nov./Dec. 1999.
M. Riccuiti, "Oracle 8.0 on the way with objects: upgrade will also build in multidimensional engine," InfoWorld, V. 17(39), p. 16, Sep. 1995.
Reinersten, Don, "Is It Always a Bad Idea to Add Resources to a Late Project?," Oct. 30, 2000. Electronic Design. vol. 48, Issue 22, p. 70.
S. Danforth, "Integrating Object and Relational Technologies," Proc. Sixteenth Annual Int'l Computer Software and Applications Conf., pp. 225-226, Sep. 1992 (abstract).
Yang, Bibo; Geunes, Joseph; O'Brien, William J.; "Resource-Constrained Project Scheduling: Past Work and New Directions," Apr. 2001.
Communication for European Patent Application No. 07250844.3 enclosing European Search Report, dated Jul. 11, 2007.
International Search Report & Written Opinion for PCT/US09/32341, mailed Mar. 11, 2009.
International Search Report & Written Opinion for PCT/US06/03160, mailed Jul. 21, 2008.
International Search Report for PCT/US08/55503, mailed Jul. 28, 2008.
International Search Report for PCT/US05/018599, dated May 15, 2007.
International Preliminary Report on Patentability for PCT/US06/03160, dated Apr. 9, 2009.
International Preliminary Report on Patentability for PCT/US2005/018599, dated Jun. 5, 2007.
International Preliminary Report on Patentability for PCT/US2008/05503, mailed Sep. 17, 2009.
International Preliminary Report on Patentability for PCT/US2009/032341, mailed Aug. 12, 2010.
Communication for European Patent Application No. 07250848.4, dated May 29, 2008.
Communication for European Patent Application No. 07250848.4, dated Aug. 13, 2007 (EESR enclosed).
Communication for European Patent Application No. 07250844.3, dated Mar. 28, 2008.
Communication for European Patent Application No. 05755530.2, dated Sep. 6, 2007.
Communication for European Patent Application No. 08731127.0, dated Oct. 13, 2009.
Anonymous "How SmartForms for Fair Blaze Advisor works", Fair Issac White Paper, http://www.FAIRISAAC.COM/, Oct. 31, 2005.
B. Thuraisingham, "From Rules to Frames and Frames to Rules," AI Expert, pp. 31-39, Oct. 1989.
Busse, Ralph et al., "Declarative and Procedural Object Oriented Views", 1998, IEEE.
Cochrane, Roberta et al., "Integrating Triggers and Declarative Constraints in SQL", p. 567-578, Proceedings of the 22nd VLDB Conference Mumbai (Bombay), India, 1996.
D. Burleson, "Adding behaviors to relational databases," DBMS, vol. 8(10), p. 68(5), Sep. 1995.
E. Bertino and P. Foscoli, "Index Organizations for Object-Oriented Database Systems," IEEE Trans. on Knowledge and Data Engineering, vol. 7(2), pp. 193-209, Apr. 1995.
F Maryanski, et al., "The Data Model Compiler: A Tool for Generating Object-Oriented Database Systems," 1986 Int'l Workshop onObject-Oriented Database Systems, pp. 73-84, Sep. 1986.
Francisco, S. et al. "Rule-Based Web Page Generation" Proceedings of the 2nd Workshop on Adaptive Hypertext and Hypermedia, Hypertext'98, Jun. 24, 1998.

H.A. Kuno and E.A. Rundensteiner, "Augmented Inherited Multi-Index Structure for Maintenance of Materialized Path Query Views," Proc. Sixth Int'l. Workshop on Research Issues in Data Engineering, pp. 128-137, Feb. 1996.

Jones, S. et al., "A User-Centered Approach to Functions in Excel," International Conference on Functional Programing, Uppsala, 2003.

Kuhn, H.W. "The Hungarian Method for the Assignment Problem," Naval Research Logistics Quarterly, 2 (1955), pp. 83-97.

L.G. DeMichiel, et al., "Polyglot: Extensions to Relational Databases for Sharable Types and Functions in a Multi-Language Environment," Proc. Ninth Int'l. Conf. on Data Engineering, pp. 651-660, Apr. 1993.

Lippert Eric, "Fabulous Adventures in Coding: Metaprogramming, Toast and the Future of Development Tools," Microsoft.com Blog, MSDN Home, published Mar. 4, 2004.

M. Riccuiti, "Oracle 8.0 on the way with objects: upgrade will also build in multidimensional engine," InfoWorld, V. 17 (39), p. 16, Sep. 1995.

M. Stonebraker, "The Integration of Rule Systems and Database Systems," IEEE Trans. on Knowledge and Data Engineering, vol. 4(5), pp. 415-423, Oct. 1992.

Manghi, Paolo et. al. "Hybrid Applications Over XML: Integrating the Procedural and Declarative Approaches", 2002 ACM.

Mecca, G. et al. "Cut and Paste", ACM, 1999.

P. Morizet-Mahoudeaux, "A Hierarchy of Network-Based Knowledge Systems," IEEE Trans. on Systems, Man, and Cybernetics, vol. 21(5), pp. 1184-1191, Sep. 1991.

S. Danforth, "Integrating Object and Relational Technologies," Proc. Sixteenth Annual Int'l. Computer Software and Applications Conf., pp. 225-226, Sep. 1992.

S. Salvini and M.H. Williams, "Knowledge Management for Expert Systems," IEE Colloquium on 'Knowledge Engineering', 3 pages, May 1990.

Schiefelbein, Mark A Backbase Ajax Front-end for J2EE Applications, Internet Article, http:/dev2dev.bea.com/1pt/a/433>, Aug. 29, 2005.

T. Chan and W. Hwang, "Towards Integrating Logic, Object, Frame, and Production," Proc. Fourth Int'l. Conf. on Software Engineering and Knowledge Engineering, pp. 463-469, Jun. 1992.

T. Sellis, et al., "Coupling Production Systems and Database Systems: A Homogeneous Approach," IEEE Trans. on Knowledge and Data Engineering, vol. 5(2), pp. 240-256, Apr. 1993.

V.M. Markowitz and A. Shoshani, "Object Queries over Relational Databases: Language, Implementation, and Applications," Proc. Ninth Int'l. Conf. on Data Engineering, pp. 71-80, Apr. 1993.

Vranes, S. et al., "Integrating Multiple Paradigms within the Blackboard Framework," IEEE Transactions on Software Engineering, vol. 21, No. 3, Mar. 1995.

W. Kim, "Object-Oriented Databases: Definition and Research Directions," IEEE Trans. on Knowledge and Data Engineering, vol. 2(3) pp. 327-341, Sep. 1990.

W. Sun, et al., "Supporting Inheritance in Relational Database Systems," Proc. Fourth Int'l. Conf. on Software Engineering and Knowledge Engineering, pp. 511-518, Jun. 1992.

Y.-M. Shyy and S.Y.W. Su, "Refinement Preservation for Rule Selection in Active Object-Oriented Database Systems," Proc. Fourth Int'l. Workshop on Research Issues in Data Engineering, pp. 115-123, Feb. 1994.

European Search Report for Application No. 05755530.2, dated Mar. 26, 2012 (3 Pages).

[No Author Listed] Solaris 9 resource manager software. A technical white paper. Sun Microsystems, Inc., Palo Alto CA, 2002, 37 pages. XP-002291080. Retrieved Aug. 3, 2004 from <http://wwws.sun.com/software/whitepapers/solaris9/srm.pdf>.

Damerau, F.J., Problems and some solutions in customization of natural language database front ends. ACM Transactions on Information Systems, vol. 3, No. 2, Apr. 1, 1985, pp. 165-184.

Devarakonda et al., Predictability of process resource usage: A measurement-based study on UNIX. IEEE Transactions on Software Engineering. 1989;15(12):1579-1586.

European Office Action issued Aug. 31, 2012 for Application No. 05755530.2 (4 Pages).

European Office Action issued Jul. 9, 2012 for Application No. 07250844.3 (8 Pages).

Extended European Search Report issued Oct. 29, 2012 for Application No. 08731127.0 (8 Pages).

Johnson et al., Sharing and resuing rules—a feature comparison of five expert system shells. IEEE Expert, IEEE Services Center, New York, NY, vol. 9, No. 3, Jun. 1, 1994, pp. 3-17.

Smedley, T.J. et al., "Expanding the Utility of Spreadsheets Through the Integration of Visual Programming and User Interface Objects," School of Computer Science, Technical University of Nova Scotia, ACM, 1996; pp. 148-155.

\* cited by examiner

Figure 3 – System Architecture

Figure 5 – DAG dependency network with branches and merges

Figure 6 – Dependency network with loop converted to DAG

METHODS AND APPARATUS FOR INTEGRATION OF DECLARATIVE RULE-BASED PROCESSING WITH PROCEDURAL PROGRAMMING IN A DIGITAL DATA-PROCESSING EVIRONMENT

RELATED APPLICATIONS

This application is a continuation of copending, commonly assigned, U.S. application Ser. No. 10/854,017 filed on May 26, 2004, entitled "METHODS AND APPARATUS FOR INTEGRATION OF DECLARATIVE RULE-BASED PROCESSING WITH PROCEDURAL PROGRAMMING IN A DIGITAL DATA-PROCESSING ENVIORNMENT," the teachings of which are incorporated herein by reference.

BACKGROUND OF THE INVENTION

The invention pertains generally to digital data processing and, more particularly, to methods and apparatus for implementation of declarative rule-based systems, and their integration into mainstream computing environments. The invention has application, by way of non-limiting example, in the design and implementation of workflow applications. Such systems typically have object-oriented architectures, and the invention takes advantage of aspects of such architectures, but it is not limited to these.

The vast majority of data processing systems use a procedural-based programming paradigm. This is exemplified by programming languages like C or Java, where execution is controlled by "procedures" consisting of sequences of statements (assignments, loops, if, etc.). The programmer of such a system is responsible for specifying, in great detail, what this sequence is, and making sure that it is correct. The sequential nature of such systems, and the resulting exponentially large number of execution paths that a system of even moderate size can take, is the fundamental basis for their complexity. It is also the source of most of the very large number of bugs that typically plague such systems.

Declarative rule-based programming is a fundamentally different programming paradigm. It is characterized by the lack of any sequential statements, and any notion of state of which the programmer has to be aware. Instead, processing is specified in the form of logical rules, where each rule relates one or more output variables to a set of input variables. Such rules can be "chained" together so that the output of one rule becomes an input to other rules.

An important characteristic of such a system is that the rules always hold. In other words, the values of the variables are always such that they are consistent with the rules. For example, if a rule states a relation between variables like $z=x+y$, then the values of x, y, and z are constrained to be such that this relation is never violated. This implies that changes to input variables (x or y in this example) must be propagated "instantly" so that the corresponding output variables are updated according to the relation. For example, if $x=1$, $y=2$, and $z=3$, and then x is changed to 2, then z must be updated to 4. In this case, "instantly" means that the update happens before any user, or any processing element outside the declarative programming system, notices an inconsistency.

The primary advantage of a declarative rule-based system is that it allows the programmer to focus on the required behavior of the application by specifying (declaring) invariant logical and arithmetic relations between variables. The complexity related to sequencing and state is hidden from the programmer.

In many applications, declarative rules can be used for solving significant portions of a problem. However, they are usually not appropriate for every aspect of a typical workflow problem. Some things (a sequence of steps to be executed for a work item, for example) are best expressed procedurally.

In view of the foregoing, an object of this invention is to provide improved methods and apparatus for digital data processing and, more particularly, for integrating declarative and procedural programming systems.

Another object of the invention is to provide such integrated computational systems that are relevant to a wide variety of applications, including, for example, modeling and processing workflows.

A related object of the invention is to provide methods and apparatus for improved integration of declarative and procedural programming systems that are suited for integration with systems having object-oriented data architectures.

A further object is to provide such methods and apparatus as can be implemented in a variety of programming languages and/or on a variety of platforms.

SUMMARY OF THE INVENTION

The foregoing are among the objects attained by the invention which provides, in one aspect, methods for entering, maintaining, and executing declarative rules that allow the programmer to express invariant relations, as defined above. The methods further include facilities for entering, maintaining, and executing procedural statements that allow the programmer to specify sequential activity, as defined above. The methods further provide for integration of the declarative and procedural systems such that changes resulting from procedural actions are immediately propagated within the declarative system so that, for all practical purposes, the data is always consistent with the invariant relations specified by the declarative rules.

In one aspect, the invention provides a method for integrating a plurality of procedural instructions in a procedural computational system with a plurality of declarative rules in a declarative computational system. In such a method, for each of the procedural instructions operating on one or more variables, a hash table indexed by variable names is utilized to determine whether any of these variables participate in at least one of the declarative rules. Upon execution of a procedural instruction that changes a variable participating in a declarative rule, other variables associated with the rule are updated so as to maintain a relationship imposed by the rule among the variables. The updating of the other variables is performed prior to execution of other procedural instructions.

In a related aspect, in a method as described above, for each of the updated values, changes associated with the updated variable are propagated to other rules, if any, in which the updated variable participates. The propagation of the change can be accomplished by modifying values of variables other than the updated variable so as to maintain relationships defined by these other rules.

A related aspect of the invention provides methods for efficiently propagating the effects of the changes, according to relevant declarative rules, so that the data is once again consistent with the invariant relations. This propagation is done in a manner such that neither the procedural system, nor the user, is able to detect the temporary inconsistency.

A further aspect of the invention provides methods for distinguishing variables involved in declarative processing (variables that are mentioned in declarative rules) from ones that are not, and for efficiently associating variables involved in declarative processing with the rules in which they are mentioned. This helps minimize the overhead in the procedural system associated with detection and propagation, and thus maximizes efficiency. It also ensures that variables not involved in declarative processing impose no penalty on execution performance of the procedural system. For such variables, execution of the procedural system is no less efficient than it would be for a purely procedural system (one with no declarative rule capability). The overall effect of these methods is that propagation is limited to computation necessary to repair any rule violations.

Other aspects of the invention facilitate use of object-oriented data architectures in the declarative and procedural programming systems. These aspects include methods for efficiently assigning values to variables that are embedded within (represent attributes of) objects, and for matching such variables (which may be embedded many levels deep within a sub-object hierarchy) with relevant rules. These aspects also include methods that allow declarative rules to refer to objects in sophisticated ways, and that propagate effects of changes between objects.

In a related aspect, the invention provides a method of integrating a procedural computational system, which supports object-oriented representation of data in a plurality of objects, with a declarative computational system, which provides rules for defining relationships among the objects. One step of such a method determines, for each object, whether that object participates in any of the declarative rules. Upon execution of a procedural instruction operating on an object that participates in at least one declarative rule to modify data associated with the object, the data modification is propagated to other data in that object, and/or to data associated with other objects, so as to render data values associated with the declarative rule consistent with the rule definition.

In yet another aspect, the invention provides a method of integrating a procedural computational system, which supports execution of a plurality of procedural instructions operating on one or more variables, with a declarative computational system, which provides a plurality of rules for defining relationships among these variables. The method calls for compiling each procedural instruction corresponding to assignment of a value to a variable participating in a declarative rule so as to effect, upon assignment of a value to the variable at runtime, updating of other variables associated with the declarative rule so as to maintain consistency of a relationship imposed by the rule among the variables.

In other aspects, the invention provides an integrated procedural and declarative computational system that includes a procedural module for executing procedural instructions operating on one or more variables, and a declarative module that is coupled to the procedural module so as to operate on these variables so as to maintain a set of relationships among the variables defined by one or more declarative rules. The system further includes a tracking module that is in communication with the procedural and declarative modules. Upon execution of each of the procedural instructions, the change tracking module detects changes, if any, in one or more variables participating in at least one of the declarative rules and reports the change to the declarative module. In response, the declarative module updates values of other variables participating in the declarative rule so as to maintain a relationship defined by the rule.

Hence, an integrated computational system of the invention allows both declarative and procedural programming styles in a single system. The declarative system can operate in a background mode to ensure that the rules are always true without the need for a workflow architect to insert explicit update requests in the procedural code. Such a capability provides a programmer with unprecedented flexibility in utilizing these two different programming tools without having to be concerned about the details of their integration.

These and other aspects of the invention are evident in the drawings and in the description that follows.

BRIEF DESCRIPTION OF THE DRAWINGS

A more complete understanding of the invention may be attained by reference to the drawings, in which.

DETAILED DESCRIPTION OF THE ILLUSTRATED EMBODIMENTS

Digital Data Processing and Workflow Systems

Figure 1:
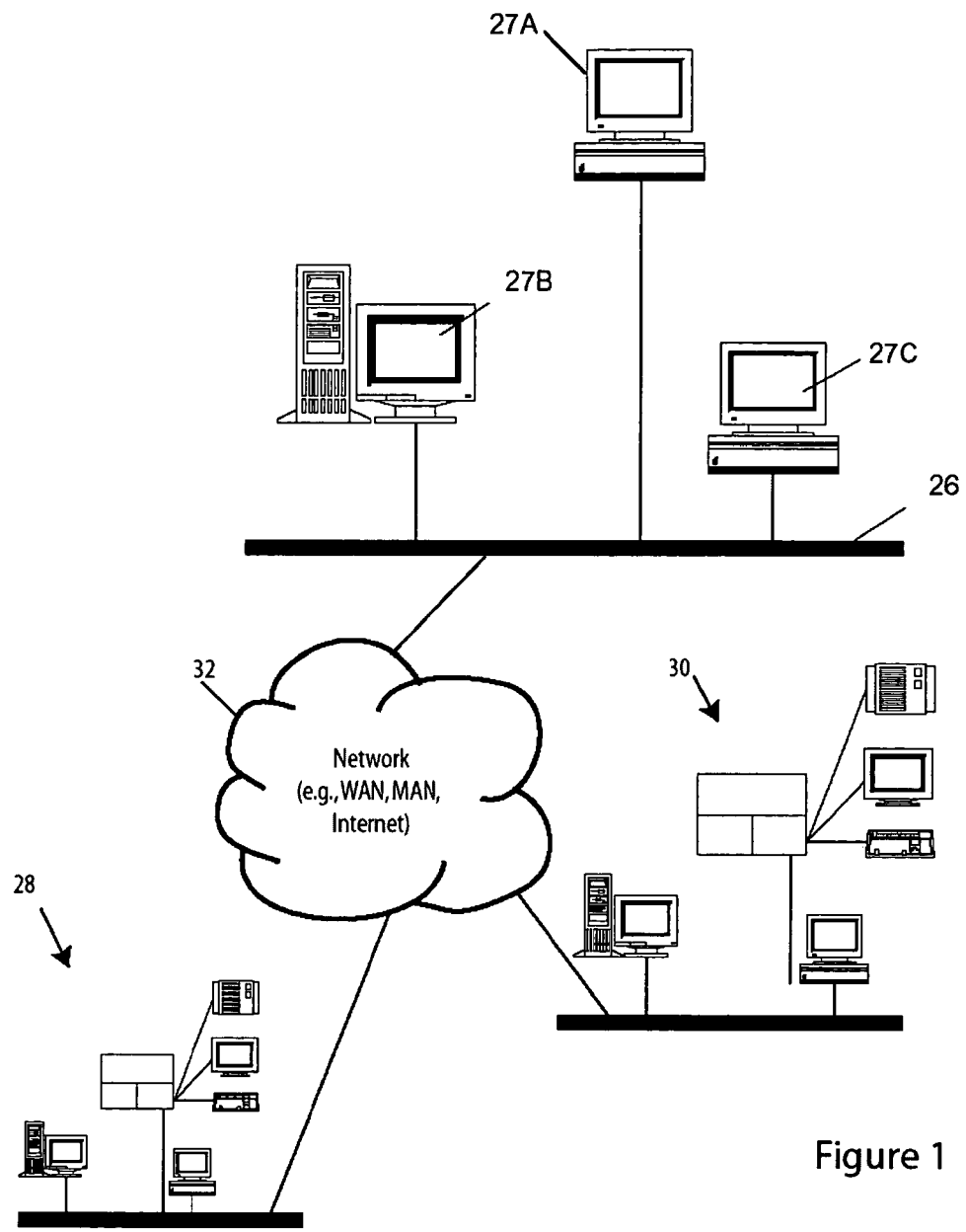
FIG. 1 depicts a digital data processing system of the type with which the invention may be practiced.

FIG. 1 depicts a digital data processing system of the type with which the invention may be practiced. The system includes one or more digital data processors, e.g., 27A-27C. These can be stand-alone units and/or networked units, as shown, that are coupled to one another and/or to other networked collections 28, 30 via a local area network (LAN) 26, wide area network (WAN), metropolitan area network (MAN) and/or Internet—the latter of which are collectively indicated by element 32. Digital data processors 27A-27C preferably comprise conventional commercially available personal computers, work stations, mainframes or other digital data processing systems of the type providing object-oriented programming (OOP) and/or runtime environments as necessary to support development and/or roll-out of the methods and apparatus described below.

Figure 2:
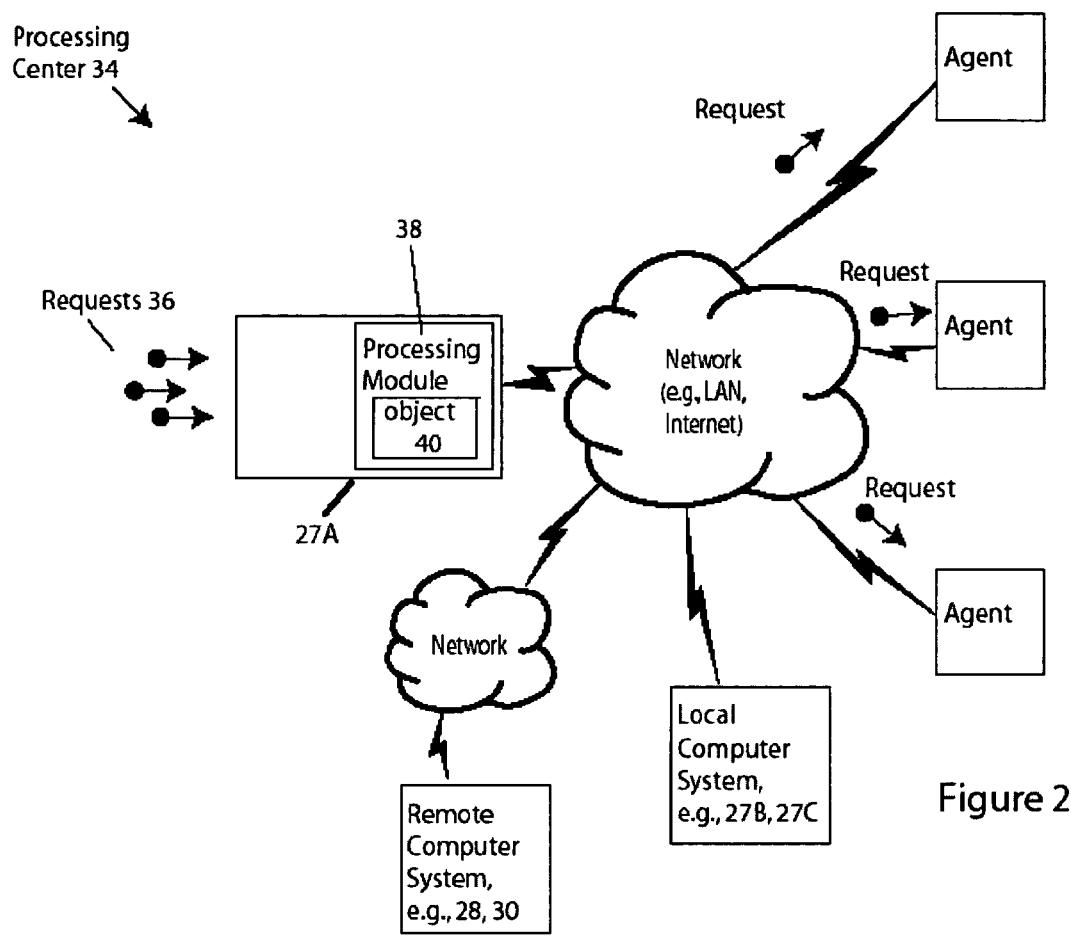
FIG. 2 depicts a digital data processing system providing a more particular environment of the type with which the invention may be practiced.

FIG. 2 depicts a digital data processing system providing a more particular environment of the type with which the invention may be practiced. Here, exemplary digital data processor 27A is employed in a processing center 34 or other environment and executes a workflow application—particularly, for routing work items.

Illustrated processing center 34 represents a service provider or other entity that utilizes work item routing. Non-limiting examples include retailers, mail order houses, professional service providers, counseling centers, and "help" bureaus, and so forth. While work item typically refers to tasks processed by the resources or to which resources may be allocated, as used herein the term refers to tasks, products, customer or other things for processing by the resources or to which resources may be allocated.

With continued reference to FIG. 2, the illustrated work items comprise customer requests 36 that require routing (or assignment) to employee-agents of the processing center 34. More generally, the illustrated agents represent any resource to which the "work items" may be allocated. This can include human resources, business resources, environmental resources, energy resources, consumable resources, or otherwise. The illustrated work items—here, customer requests—are processed in the manner described in the aforementioned, incorporated-by-reference application. Thus, for example, requests or other work items received by the processing center 34 are subject to intake processing, e.g., by intake processing personnel and, then, are passed to digital data processor 27A for routing to the agents (or other resources).

Architecture for Integrated Declarative/Procedural System

Figure 3:
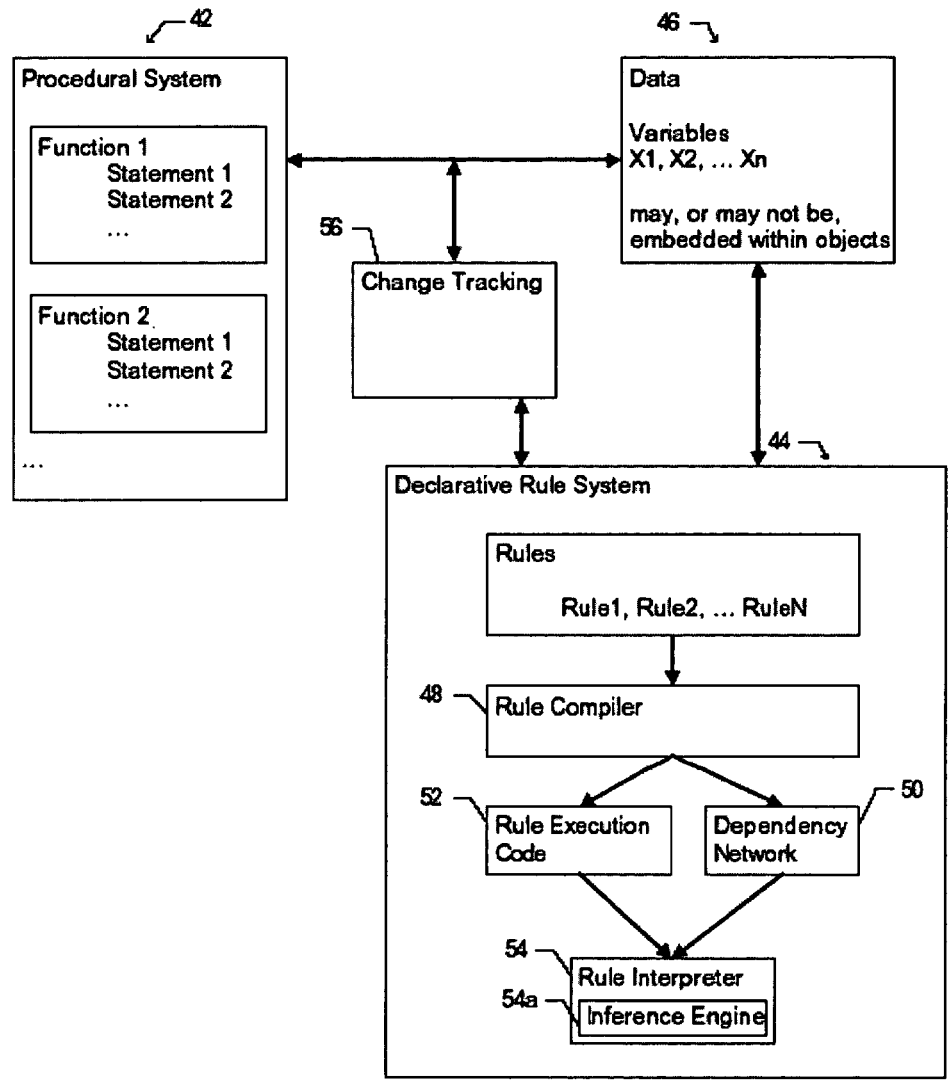
FIG. 3 shows the architecture of a system according to one practice of the invention.

FIG. 3 depicts an exemplary architecture of an embodiment of a computational system of the invention that includes a procedural computational system 42 integrated with a declarative computational system 44. The procedural system, includes functions with statements that are executed in sequence, interacts with a data store 46 by reading and writing variable values. The variables can exist in virtual memory, and may be embedded as properties of objects. The data in virtual memory may also be loaded from and saved to persistent storage (not shown in FIG. 3).

The declarative rule system 44 also reads and writes variable values, but the execution is more specialized. Declarative rules are compiled by a rule compiler 48 into a dependency network 50 and execution code 52 for each rule, as described in more detail below. The dependency network is an efficient representation of the rules, which is suitable for interpretation by a rule interpreter 54. The rule interpreter can utilize the dependency network to determine the correct sequence in which the declarative rules need to be executed. It also uses the dependency network to determine the subset of rules that need to be executed when there is a change (typically, a very small subset of all the rules needs to be executed in response to a change). It may also use the dependency network to determine additional objects that may have to be loaded into virtual memory from persistent storage.

A change tracking system 56 detects a change of a variable value caused by execution of an assignment statement in the procedural system. Before the next statement is executed, the change tracking system notifies the declarative rule system of the change. An inference engine 54a determines a sub-network, within the dependency network, that is associated with the change. The inference engine uses this sub-network to determine the rules that need to be executed in response to the change, and the correct sorting of these rules. It then executes these rules, thus removing any inconsistency in the data resulting from the change made by the procedural system. The procedural system then executes its next statement.

Operation of the various components shown in FIG. 3 is now explained in more detail. In particular, the procedural and declarative programming systems are described in detail, along with the change-tracking system. Additionally, the widely used object-oriented data representation is discussed. For each of these components, definitions of important terms are given, together with explanatory diagrams and examples. The definitions are primarily for the purpose of describing the invention, and are not intended to be limiting of the scope of the invention. In most cases, the definitions correspond to industry-standard terminology. However, some of the definitions are specific to this invention, and are made primarily for convenience of describing the invention.

Procedural Programming System

For the most part, the definitions introduced in this section are based on standards and conventions used in most popular procedural programming languages (C, for example). Structured data types (arrays, structures, objects, etc.) are not covered in this section as they are not central to this discussion. Object representations are covered separately in a subsequent section.

EXAMPLE 1 below shows an exemplary listing of a typical procedural program which illustrates many important features of procedural programming systems. In this example, the function compute_order takes parameters for product, quantity, store_location, monthly_payment, and number_of_payments. It computes a price before tax based on product and quantity. It then calls compute_order_tax to compute a tax based on the state in which the store where the purchase is made is located. Compute_order then adds this tax to compute total price. Finally, it iterates over number_of_payments to compute the remaining balance after this number of payments, using a fixed monthly interest rate of 0.5%. This remaining balance is returned. Note that prices are in cents, so integer variables can be used to represent prices.

This simple program illustrates many of the key features of procedural programming systems including variables and constants with different data types (price_before_tax and principal, for example), operators, expressions, and assignment statements (price_before_tax=product_price*quantity, for example), control flow statements (the if statements and for iteration), and the use of functions (compute_order calls the function compute_order_tax). These terms are now defined more formally.

Data Type—

A data type specifies the format and memory allocation requirements for a datum. It also constrains the operations that can be performed using that datum. Basic data types include boolean, character, string, integer, and float.

Example: int

Constant—

A constant is an unchanging datum. For example, 5 is an integer constant, 'a' is a character constant, and 3.7 is a float constant.

Example: "flashlight"

Variable—

A variable is a datum of a particular type that may change. The datum is referenced by a variable name. Variables can be any one of the basic data types.

Example: int product_price;

Operator—

Operators produce values based on a set of arguments. Operators can be categorized according to the types of their arguments, and the types of the values they return. For example, arithmetic operators, such as +, −, *, and /, take arithmetic arguments (integer or float) and return an arithmetic result. Relational operators like >, <, ==, and != take arithmetic arguments and return Boolean values. Logical operators, such as "and", "or", and "not," take boolean arguments and return boolean values.

Expression—

An expression is a combination of operators with associated variable and/or constant arguments.

Examples:
x+y+5 (arithmetic expression)
A and B (logical expression)
x>5 (relational expression)
product_price*quantity (arithmetic expression)

Statement—

A statement is the most basic building block for procedural processing. There are different kinds of statements. One of the most basic is the assignment statement, which sets the value of a variable to the result of an expression.
Examples:

$$z=x+y+5;$$

$$price\_before\_tax=product\_price*quantity;$$

The end of a statement is indicated by a semicolon in many languages.

Note that the procedural programming system does no processing between statements. That is; variables can be changed or accessed only within statements. Suppose that the procedural system executes an assignment statement that sets a variable in such a way that one of the declarative rules is no longer consistent. If the declarative system performs necessary update computations immediately after this statement, and before the next procedural statement is executed, then the system is consistent once again. In other words, the consistency of the declarative rules is restored before the procedural system has any chance to notice any inconsistency. Thus, if declarative processing is performed between procedural statements, it is possible to give the illusion to the procedural system that declarative rules are always true.

Control Flow Statements—

A number of different kinds of statements are useful for controlling flow of processing in a procedural language. These statements, when combined with appropriate state variables (counters, for example), update these state variables, and guide processing based on these state variables.
Examples: if statement

```
if (x > 5)
    z = 5;
else
    z = x;
if (product == "flashlight")
    product_price = 500;
else if (product == "battery")
    product_price = 100;
```

Several control flow statements control iteration using counter state variables. These include "for" and "while" statements.
Examples: for statement

```
for (x=0; x<x_max; ++x)
    z = z * x;
for (i=1; i<=number_of_payments; ++i)
{
    principal = round(principal +
            principal * monthly_interest - monthly_payment);
}
```

Example: while statement

```
while (x<x_max)
{
    y = y * x;
    x = x + y;
}
```

The brackets indicate a set of statements to execute within the body of the while loop.

Functions—

Functions provide a mechanism for re-using code; allowing a useful fragment of code to be invoked from many places in a program. A function has a name, a set of parameters, and a body that consists of a set of statements that do computation based on the parameters. The function is called using the function name, along with a set of values for the parameters.
Examples:

$$y=sqrt(x);$$

$$tax=compute\_order\_tax(price\_before\_tax, store\_location);$$

By way of example, conventional work flow systems can be viewed as specialized procedural systems in which performance of a step in work flow processing corresponds to execution of a procedural statement.

Object Representation

This invention can be used for programming systems that do not use object representations (that use unstructured variables only). However, the vast majority of practical implementations use some form of structured data, and it is for such systems that the invention provides the most benefit.

Note that, for the most part, the definitions that follow are based on standards and conventions used in most popular object-oriented programming languages (like Java or C++). Note also that these definitions do not imply any particular implementation. They merely specify requirements for the implementation, and thus impose some constraints. However, there is still significant implementation flexibility, and some implementations may be more efficient than others.

Class—

A class is a type specification for a structured data collection called an object. The type specification is represented as a set of elements. A class has a unique name that distinguishes it from other classes and objects.

Element—

An element has a name as well as information associated with that name. There are two types of elements: data elements, and methods. A data element (also known as a property) contains a data type specification, and a data value. For elements that are part of a class specification, this value is the default value (the initial value for the element when an object of the class is instantiated). A method element contains a reference to a function, as well as type specification information for the parameters of the function, and the values returned by the function.

Object—

An object is a structured data collection containing a set of elements, and some other information. An object is created (or instantiated) according to a specification from a particular class. A possible implementation of such an instantiation would be to simply copy the elements of the class to the object. An object maintains a reference to its associated class. An object is also given a unique name. That is; its name is different from that of any other object, regardless of class. An object is given the name when it is instantiated. An object may also be deleted, at which time, its resources (memory used, and unique id) are recycled to pools from which they may be re-used.

Sub-Objects—

A property (data element) of an object may, itself, be an object. An object contained in a property of another object is called a sub-object of the containing object. A property of an object may also contain a set of sub-objects.

Related Objects—

A property of an object may contain a reference to another, related object. This is distinct from the notion of a sub-object in that the property contains a reference to the related object rather than the complete information for the object, as is the case with a sub-object. For example, suppose an object, A1, contains a sub-object, B1, and a reference to a related object C1. The related object C1 can exist independently of A1, but B1 cannot. Thus, if A1 is deleted, B1 will be also deleted because its memory is allocated as part of A1. However, C1 will not be deleted.

Inheritance—

A class may define its own elements. A class may also, optionally, have a superior class, from which it inherits elements. Thus, when an object of the class is instantiated, it will have elements defined by its associated class, as well as elements inherited from the class' superior class, if such a superior class exists. If an element defined for a class has the same name as an element inherited by the class, the element defined for the class is used, and the inherited element is ignored.

Data Access and Set Methods—

A class can be retrieved by using its name as a key.

An object can be retrieved by using its name as a key.

A data element of an object or class can be retrieved by using the object or class name, followed by the data element name. The two names are separated by the delimiter ".".

Examples: person.height or FredSmith105.height

When a data element contains a set of sub-objects, or a set of related objects, elements of the set can be accessed using an index specified in parentheses after the data element name.

Example: order.items(3)

This accesses the third element in the set order.items

Example: person.children("Fred")

This accesses the element in the set person.children indexed by "Fred". Note that the index need not be an integer.

A BNF grammar for data element (property) designation is given in EXAMPLE 4 below. Exemplary object configurations and property designations using this grammar are given in EXAMPLE 5 below.

A data element of an object or class can be set using the "=" operator. The left side must be a property designation using class or object name followed by element name, as described above. The right side must contain a data value that is consistent with the type specification for the data element.

Example:

vacation.fuel_cost=vacation.travel_miles*vacation.car.cost_per_mile

Method Invocation—

A method is invoked using the object or class name, followed by the method element name. Parameters are provided within parentheses.

Example: Person.max(Fred.height, Joe.height)

Values returned by functions can be used to set data elements using the above-described syntax Example:

MyCompany.AnnualSales=MyCompany.SumOverMonths(2002, "Sales")

Object Creation and Deletion—

An object can be created (instantiated) using a global create method that takes, as parameters, the class and the name for the object. Optionally, data element name—value pairs can be included as parameters to this method for the purpose of initializing the named data elements to the values, as long as these values are consistent with the class-specified data types for the data elements. Also, optionally, constructor methods that take zero or more arguments can be specified at the class level. The constructor methods are invoked after memory for the object is allocated, and its data elements are initialized to their default values.

An object can be deleted using a global delete method that takes, as parameter, the name of the object. When an object is deleted, its resources (allocated memory, and unique id) are recycled to pools from which they may be re-used. It is the responsibility of the developer to delete any outstanding references to this object (from other objects, for example).

Object Persistence—

In a typical object-oriented system, object instances exist in the virtual memory space of the computer's operating system. Objects in virtual memory can easily be accessed and modified by application algorithms (declarative or procedural). The virtual memory representation is used for all computations, both declarative and procedural, that modify data elements of objects. Virtual memory is, however, volatile. For example, when the computer's operating system shuts down, virtual memory is reset, and any objects in it are lost. To prevent this, objects must be made persistent. That is; the transient objects residing in virtual memory must be saved to persistent memory. This is typically achieved using a database and a suitable API that supports load and save operations on objects.

Object Load and Save—

A load operation can load an object into virtual memory from a database. The load operation takes the object's name as a parameter and uses the name to find the object in the database. The object's name must be unique within the database. After the object is loaded into virtual memory, it is identified within virtual memory by this same name. A save operation saves the object from virtual memory to a database (to persistent storage). The save operation also takes the object's name as a parameter and uses this to locate the object in virtual memory, and to associate the object with this name in the database.

In typical procedural programs, object loads and saves are performed explicitly, as part of the program. Thus, the programmer is responsible for loading any objects needed in a computation before the computation is performed, and for saving the objects that have changed after the computation has been performed.

The same approach is used for declarative processing systems when it is known that all computations will be restricted to a single, particular object. Consider, for example, the following declarative rule (see also related property designation examples in EXAMPLE 5):

Order.TotalCost=Sum(Order.OrderItems(*).Cost)

This rule can be applied to any object of class Order (it could be applied to the object Order-1 in EXAMPLE 5, for example). The object to which the rule is applied is called the context object. The rule computes the TotalCost property of the Order context object by summing the costs of individual order items. If the OrderItems property contains a set of sub-objects, then all computations performed by this rule are restricted to the context object. If all rules in a dependency network have the same context object, all computations in the declarative system defined by the dependency network are restricted to that context object. This important special case is referred to here as the single object context case. The case where computation is not restricted in this way is referred to here as the multiple object context case. In the previous exemplary rule, if the OrderItems property contains a set of related objects, rather than a set of sub-objects, then computation is not restricted to a single context object. In other words; computation is performed using multiple related objects.

For the single object context case, load and save of the object can be accomplished by using a procedural program that wraps the declarative processing with appropriate loads and saves of the object. In a typical scenario, the procedural program loads the object, and then performs some computations on the object. These computations may result in changes to the object, requiring declarative processing to propagate the changes. After the declarative processing is completed, procedural processing resumes and ultimately saves the object.

The multiple object context case is more complicated. Although procedural processing may begin with one object, the declarative processing, if it uses rules that span related objects, will require other objects to be loaded from the database. In the previous exemplary rule, if the Order.items property contains a set of related objects, rather than a set of sub-objects, the rule spans multiple objects. Execution of the rule requires a multiple object context.

Suppose that the rule system begins with the goal of computing the TotalCost property of Order-1, and would like to use the above exemplary rule. Suppose that Order-1 is loaded into virtual memory, but that the related objects in the OrderItems property are not. The rule system must then first load these related objects before executing the rule.

Alternatively, suppose that the procedural system has just changed the Cost property of an OrderItem object (let us call this OrderItem-1), and that the declarative rule system is invoked to propagate changes according to rules. The rule system first needs to check whether the above exemplary rule even applies. This is because the OrderItem object that was changed may not fit the pattern required by the rule. The rule states that the OrderItem object in question must be a member of the set of related objects in the OrderItems property of an Order object. If this is not the case, then the rule should not be used. For example, if OrderItem-1 is a free-standing object, i.e., an object not related in any way to any other object, the rule does not apply.

The manner in which the rule pattern is checked can depend on the details of the object relation structure. To check if OrderItem-1 is referred to in the OrderItems property, a relation that is the inverse of OrderItems is used. For example, the OrderItem class can be given an additional property called ParentOrder. OrderItem instances that are referred to in the OrderItems property of an Order would have a reference to that Order in their ParentOrder property. OrderItem instances that are not referred to in this way would have a null reference in their ParentOrder property. With this property, the rule system can easily check whether OrderItem-1 fits the pattern required by the rule.

If OrderItem-1 does fit the pattern, the rule system uses the ParentOrder property to reference the corresponding Order and load it into virtual memory if necessary. It then uses the OrderItems property of the order to load all the other OrderItem instances needed. When this is done, the complete multiple object context is available, and the rule can be executed.

It is difficult for the programmer (of the procedural or declarative system) to determine, explicitly for all possible situations, all objects that may have to be loaded in this way from the database. Therefore, it is preferable to determine this automatically. This can be accomplished by the rule compiler, which parses context information from rules, and generates code that loads required missing objects for any situation that may be encountered. This will be discussed in more detail in the subsequent section on declarative rules.

Databases for Object Persistence—

The illustrated system can utilize the following approaches for persistent object storage: 1) converting the objects into normalized tabular form and storing them in a relational database, and 2) converting them into an XML (Extensible Markup Language) format, and storing them in an XML document. These two approaches can also be combined; XML formatted data can be stored in relational database tables. Databases designed specifically for storing objects are also commercially available, but these do not typically enjoy the immense popularity of relational databases and XML, partly due to their complexity. The most typical representation of objects in a relational database is as "normalized" tables. In this representation, each object class has its own table within the relational database. Each row of such a table corresponds to an object instance. The first column of such a table is typically the object name. Subsequent columns correspond to scalar properties of the object. Properties containing sets (of sub-objects, or references to related objects) are not represented in the table at all! Instead, the tables corresponding to the sub-object or related object class have columns for "parent" object. Thus, the information about the object/sub-object relation is stored with the sub-object, not the parent. EXAMPLE 6 below shows the exemplary object configuration from EXAMPLE 5 represented in this normalized form.

Retrieving all the information for a particular object requires the equivalent of a database "join" operation. This can be accomplished by using an SQL query that specifies tables to be included. For example, to retrieve all Order-Item instances for an Order, the query must specify that OrderItem.ParentOrder=Order.Name. A database join can combine information from different tables into one new table. For purposes of loading an object from the database into virtual memory, the actual join (creation of the new table) is unnecessary. Typically, the information from the various tables found by the query is used to directly create the object in virtual memory.

Table structure in a relational database can be defined by employing "schemas", which are analogous to object class definitions.

Conversion to XML is relatively straightforward because XML is designed for storing persistent objects. EXAMPLE 7 shows the exemplary object configuration from EXAMPLE 5 represented in XML form. Note that with the XML representation, sub-object information is stored within the parent object, so there is no need to perform a join.

The structure of XML documents can be defined using a "Document Type Definition", which is analogous to an object class definition. XSL (Extensible Style Language) patterns can be used to query XML-structured data. This is useful for loading into virtual memory particular objects that meet certain criteria.

Declarative Programming Systems

Standards for declarative systems are not as well developed as they are for procedural systems. Therefore, the definitions introduced in this section are not necessarily based on any industry standards. The definitions are introduced primarily to help explain the invention, and not to track evolving standards.

Declarative Programming System—

A declarative programming system typically includes a set of declarative rules, a set of associated variables, and a rule interpreter that computes values for the variables based on the rules (see FIG. 3).

Declarative Rule—

A declarative rule states a relation between a set of variables that is always true. Although a declarative rule can have the same format as an assignment statement, its behavior is very different. Whereas an assignment statement makes the assignment as a procedural step (at one point in time), a declarative rule ensures that the relationship is always true. There is no notion of processing or state; it is "timeless". It specifies an invariant relation.

A declarative rule may have many forms. Often, declarative rules are expressed as a formula or equation as in $$y=10*x+5$$

or $$A=B \lor C$$

Declarative rules are also, often, expressed as "if-then" relations, as in if light_switch_on and (not light_broken) then light_on Note that besides the expression-based rules shown in the above examples, declarative relations can also be expressed by using tables, or even procedures. If the computation is performed by a procedure, it must ensure that the output is always deterministic, based on the input variables. Thus, the procedure must base its computations solely on the input parameters, and is not allowed to access any external variables that may introduce state and non-deterministic behavior.

Note also that object representations can be accommodated by such rules, as in

```
loan.payment=loan.principal*loan.interest
airplane.weight=airplane.empty_weight+sum
    (airplane.passangers.weight)
```

Rule Compiler—

A rule compiler, such as the rule compiler 48 shown in FIG. 3, parses rules according to a grammar such as the one shown in EXAMPLE 15 below. The parsing may be accomplished by any standard parser; an ATN parser, for example.

The compiler generates code that performs the computation of the rule. This can include context generation code as well as rule body execution code. Context generation code checks whether the object to which the rule is being applied fits the pattern of objects required by the rule (as specified in the rule's context specification). Context generation code also loads any missing required objects from persistent storage. For example, consider the second exemplary rule shown in EXAMPLE 15. Suppose that the Quantity property of an instance of class OrderItem changes. The rule may, or may not, be applicable. The context generation code begins with the focus object (in this case, the instance of OrderItem) and checks if the ConfiguredProduct property of this object refers to an instance of class ConfiguredProduct. If it does not, then the match fails, and the rule cannot be executed. Otherwise, the rule can be executed, but the ConfiguredProduct instance must be loaded from persistent storage if it is not already resident in memory. Now, suppose that the Cost property of an instance of class ConfiguredProduct changes. Again, the rule may, or may not, be applicable. The focus object is not the instance of ConfiguredProduct. The context generation code begins with this focus object and checks if its ParentOrderItem property (inverse of ConfiguredProduct property) refers to an instance of class OrderItem. If so, the rule may be executed. Again, it may be necessary for the context generation code to load the OrderItem instance from persistent storage.

The rule compiler generates context generation code based on the context specification in the rule (see EXAMPLE 15). The generated code covers all possible focus object situations that may arise. In the second exemplary rule in EXAMPLE 15, the focus object may be an instance of ConfiguredProduct, or an instance of OrderItem. In the former case, the corresponding instance of OrderItem must be loaded to complete the context. In the latter case, the corresponding instance of ConfiguredProduct must be loaded to complete the context. If the context cannot be completed, the pattern match fails, and the rule cannot be executed.

The rule compiler also generates rule body execution code (code corresponding to the rule body). This code assumes all context objects have been loaded, and it performs the actual computation of the rule, computing a new value for a property of one of the context objects based on properties in all the context objects.

Figure 4:
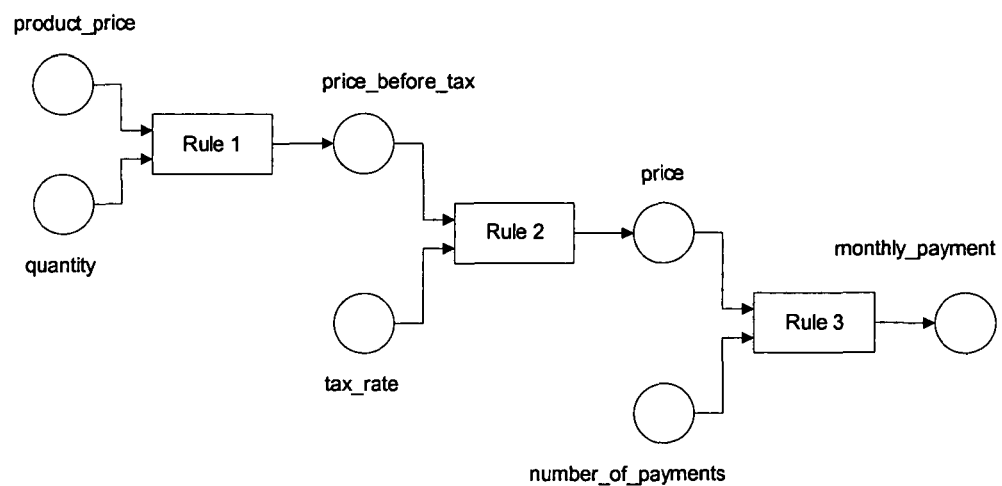
FIG. 4 shows the dependency network for rule set shown in EXAMPLE 8.

The code generated by the rule compiler may be in Java, C, or any other language suitable for processing by the rule interpreter (see below). The rule compiler also generates a dependency network; which is a graph that represents, in an efficient form, the dependencies between variables and rules. The dependency network can be used to determine input and output variables of rules, and rules that compute and use variables. The rule interpreter can utilize this information to determine a subset of rules that need to be executed when a variable changes, and to determine the correct execution sequence for the rules. An exemplary dependency network is shown in FIG. 4.

Rule Interpreter—

A rule interpreter, such as the rule interpreter 54 shown in FIG. 3, can represent an algorithm that reads the rules in a declarative programming system and uses them to compute values for the variables mentioned in the rules. Such algorithms can include, for example, inference engines, equation solvers, and a large variety of optimizers. A rule interpreter performs computations that ensure that declarative rules are always true. Thus, if a variable is assigned a new value (by a procedural statement, for example), that new value might cause a violation of a declarative rule. The rule interpreter is run by passing it the set of variables that have changed. The rule interpreter employs the declarative rules to propagate the effects of those changes. It performs this processing until all declarative rules are consistent once again.

EXAMPLE 8 below shows a simple exemplary declarative rule set for computing a monthly payment. Rule 1 computes price_before_tax based on product_price and quantity. Rule 2 computes price based on price_before_tax and tax_rate. Rule 3 computes monthly_payment based on price and number_of_payments. The rules in this example all have an important, common characteristic: they all express a mapping from a set of input variables to a single output variable. They are a special case of declarative rule that is defined here as a "simple formula".

Simple Formula—

A "simple formulat" is a type of declarative rule that expresses a mapping from a set of input variables to one output variable. The output variable cannot be a member of the set of input variables.

Rule systems consisting only of simple formulas are important because they can be used for a wide range of applications, and because rule interpreters can take advantage of their special characteristics in order to simplify and speed up variable value computation. A declarative programming system consisting only of simple formulas is defined in the following way.

Simple Formula Declarative System—

A type of declarative programming system having the following characteristics:

all rules are simple formulas
any variable has, at most, one formula that computes its value the overall rule system has well-defined input and output variables It is illegal for a variable, which is computed by a formula, to be set by any other means (direct user input, for example).

There are no loops in the rule system.

EXAMPLE 8 below illustrates a simple formula declarative system. Note that the outputs of some rules can serve as inputs to others. This leads to the notion of a dependency network; a graph that represents the dependency between variables and rules. FIG. 4 depicts the dependency network for the exemplary rule set of EXAMPLE 8. The input variables for this dependency network are product_price, quantity, tax_rate, and number of payments. The output variable is monthly_payment. The arrows indicate input/output directionality of the rules.

The rules and variables in the network shown in FIG. 4 form a directed acyclic graph (DAG). In a DAG, the arcs are all directed, and there are no loops. The dependency network for a simple formula declarative system is always a DAG. This has important implications for the rule interpreter. In particular, elements of a DAG can always be sorted into a linear list so that order dependencies expressed in the DAG are preserved. This sort operation is an important part of what the rule interpreter must do. When an input variable changes, the rule interpreter must determine which rules (typically a subset of all the rules in the dependency network) must be executed, and what their execution sequence should be. Once this is done, the actual execution of the rules is straightforward. For example, if product_price changes, all 3 rules need to be executed in the following sequence: (Rule1 Rule2 Rule3). If only tax_rate changes, then the execution list is (Rule2 Rule3). If only number_of_payments changes, then the execution list is (Rule3).

The rule interpreter can generate the execution list by using the recursive algorithm shown in EXAMPLE 9 below. With appropriate node pointer implementation, the algorithm is fast. Such pointers allow for the insertion operation (in insert_current_list) to be performed in a single step. The flag, which indicates that a node is in the execution list, allows for a fast check (rather than searching through the list). Thus, the algorithm can be implemented so that its performance is of order N, where N is the number of nodes in the DAG. The speed is therefore roughly linearly proportional to the number of nodes in the DAG. Note that with this algorithm, variable nodes, as well as rule nodes, are inserted into the execution list, but they can easily be pruned or skipped.

For any change in a variable in the dependency network, this algorithm searches forward in the DAG, and extracts the relevant sub-network corresponding to rules that must be executed. EXAMPLE 10 below shows the call sequence, and the execution list, at each step in the algorithm for a change to the variable tax_rate in the exemplary DAG of FIG. 4.

Figure 5:
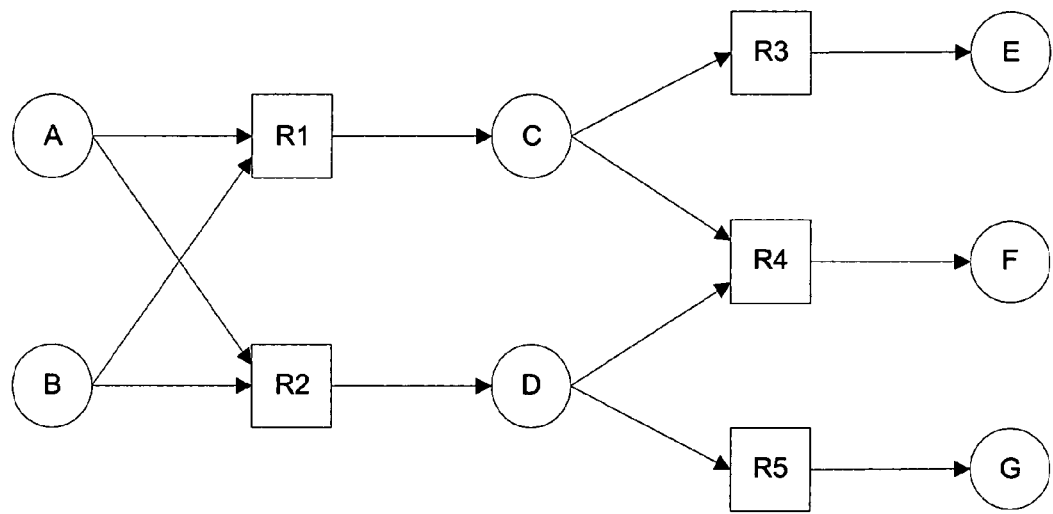
FIG. 5 shows a DAG dependency network with branches and merges.

FIG. 5 shows a more complicated DAG dependency network, with branch and merge paths. There are branches from variables A, B, C, and D because each of these variables is an input to more than one rule. There is a merge in the DAG at rule R4 because it takes input from two variables (C and D) that are on paths that have branched earlier in the DAG. EXAMPLE 11 shows the call sequence, and the execution list, at each step in the algorithm for a change to the variable A.

The algorithm described above can be applied repeatedly, when more than one variable is changed, to compute an execution list that takes all changes into account. For example, if both variables A and B in FIG. 5 change, the algorithm can be called once for the change in variable A, and then again for the change in variable B. The second call will add appropriately to the execution list. In this case, nothing has to be added (all rules are already being executed). Generally, however, there will be additions.

This approach allows the rule interpreter to generate an execution list, and then, possibly, defer the actual rule execution, which is typically far more computationally intensive than generation of the execution list, until a later time. This can be advantageous for the following reasons. In certain applications, values of variables affected by the changed variable may not immediately be needed (the values may not have to be accessed by other code in the application for some time after the change). In some cases, they may never be needed, or they may not be needed for a long time. In such situations, it is often better to defer rule execution until the time when a variable is actually needed. This allows utilizing algorithms that tailor the rule execution to limit it to only those variables that are needed. Also, this deferral allows changes to accumulate, which can save rule executions. In the dependency network of FIG. 5, each of the changes to variables A and B requires execution of every rule in the network. Thus, waiting for both to change, instead of executing after each individual change, cuts the number of rule executions in half. Of course, it is not always possible to defer execution because deferring execution leaves the system in an inconsistent state, where some rules may be violated. In the previous example, if the effects of the change to variable A are needed immediately after the change, and before the change to variable B, then rule execution must happen after the change to variable A.

Although deferral of rule execution may be possible, deferral of update of the execution list is not. In the previous example, if variable A is changed, it is important to note, immediately, the variables affected by the change, even if rule execution is deferred. The presence of the variables in the execution list at the end of EXAMPLE 11 indicates that they all need to be recomputed in response to the change to variable A.

Propagation for simple formula declarative systems is relatively simple and efficient. Unfortunately, simple formula declarative systems are not adequate for all applications. For such applications, some of the restrictions on simple formula declarative systems have to be lifted. This results in a more complicated system, with more complex rule interpretation. One such type of system is the Multiple-source Directional Declarative System, described below.

Multiple-source Directional Declarative System—

A type of declarative programming system having the following characteristics:

Rules are mapping from set of input variables to set of output variables

An output variable cannot appear in the set of input variables

A variable's value may be computed by more than one rule
All rules that compute a value for a variable must compute consistent results
If they don not, there is an inconsistency (infeasibility)
Such inconsistencies can be fixed by retracting inconsistent inputs, or by changing the rules themselves Any variable in the system can be set by other means (direct user input, for example)

A variable's value may be "unknown"
Rule may be conditionalized so that it does not necessarily have to produce a value in all circumstances (if-then rules, for example)

"Unknown" must be included as part of the formal representation of possible variable values.

Loops in dependency network can exist, and must be dealt with appropriately.

Figure 8:
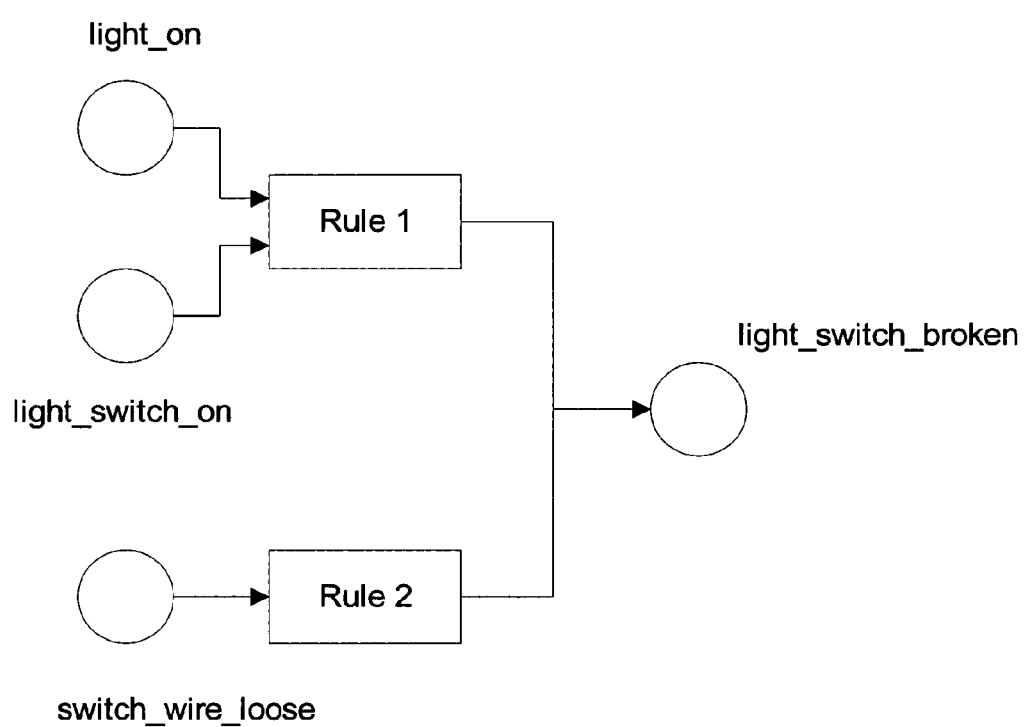
FIG. 8 shows a dependency network for multiple-source directional declarative system that can be incorporated in some embodiments of an integrated computational system in accordance with the teachings of the invention.

EXAMPLE 12 below shows an exemplary set of rules, and FIG. 8 shows an associated dependency network, for a multiple-source directional declarative system. The example is a diagnostic system, which is a common application for multiple-source directional declarative system. The rules are all "if-then" rules that operate on boolean variables. This is a typical form for this type of application, but more general rule forms and variable types are possible as well.

The fact that zero, one, or possibly more than one rule may produce a value for a variable drastically complicates matters for the rule interpreter.

The fact that rules may fail to produce a value for a variable means that all variables, regardless of type, must include a representation of the value "unknown" in their domains. Thus, for example, boolean variables can have values true or false, or they may have the value unknown. Similarly, integer variables can have an integer value, or the value unknown. This complicates variable value computation. The simple sort and execute algorithm used for simple formula declarative systems is not adequate here. To see why this is so, consider EXAMPLE 12. Suppose that initially, light_on is false, light_switch_on is true, and switch_wire_loose is false, so Rule 1 is used to conclude that light_switch_broken is true. Now, suppose that the variable light_on changes to true. The sort algorithm for simple formula declarative systems would put Rule 1 on the execution list. However, execution of Rule 1 has no effect. Because light_on is now true, the antecedent of Rule 1 fails, and no conclusion is made. The value of light_switch_broken is unchanged; it is still true. This is incorrect. Its value should be unknown.

For this type of system, the correct approach is to first retract values of variables that are affected by a change, and to set their values to unknown. After that, the value of each such variable is recomputed by searching backwards in the dependency network to find all rules that are involved with computing a value for that variable. An exemplary algorithm for performing this task is summarized in EXAMPLE 13. Note that this algorithm uses a combination of forward and backward search of the dependency network. It performs a forward search, similar to that used for simple formula declarative systems, to identify variables that are affected by a particular variable change. For each such affected variable, it performs a backward search to find rules involved with computing its value.

In EXAMPLE 12 (See also FIG. 8), when light_on becomes true (as discussed above), the algorithm of EXAMPLE 13 first retracts the value of light_switch_broken and sets it to unknown. It then puts Rule 1 and Rule 2 on the execution list, since both of these can compute values for light_switch_broken. It then executes these rules. In the scenario described above, neither rule succeeds, and the value of light_switch_broken remains unknown.

The fact that rules may produce more than one value for a variable also creates complications. If the rules all produce the same value for the variable, then everything is consistent, and there is no problem. However, if they produce different values, then there is an inconsistency (sometimes also called an infeasibility). Suppose Rule 1 in EXAMPLE 12 were modified as follows:

Rule 1:

```
if ( (not light_on) and light_switch_on)
    then light_switch_broken
    else (not light_switch_broken)
```

Now, suppose that light_on is true, light_switch_on is true, and switch_wire_loose is also true. Rule 1 will compute false for light_switch_broken, and Rule 2 will compute true. There is an inconsistency, which typically means there is a bug either in the rule set, or in the inputs. In this case, it would make sense to inspect the switch wire closely to see if it is really loose.

The rule interpreter deals with inconsistencies of this sort by warning the user, and providing information about the rules and input variables that cause the conflict. The user then has the option of changing the variables or rules until the conflict disappears.

Another complication with multiple-source directional declarative systems is that logical loops can occur in the dependency network. This does not necessarily indicate a bug in the rule set. In fact, such loops are sometimes perfectly reasonable and useful. Consider the exemplary rule set shown in EXAMPLE 14 and FIG. 9. This rule set is perfectly logical and reasonable. However, the resulting dependency network is not a DAG. Hence, it will cause problems for the algorithm given in EXAMPLE 13.

The problem is resolved by converting the dependency network to a DAG by utilizing, for example, the notion of a well_founded support. A variable cannot be a well_founded support for itself, but it can be a well_founded support for another variable. Thus, in EXAMPLE 14, light_switch_on and light_on are well_founded supports for light_switch_broken. The algorithm that converts the dependency network of EXAMPLE 14 into a DAG searches backward from each variable, finding its well-founded supports. The search stops when there are no input rules for a variable, or when a loop is detected (when a variable already in the search path is encountered again). This results in the DAG dependency network shown in FIG. 6. This simply represents the fact that, in this example, two of the three variables must be input to the system so that the third can be computed. Note that the output of Rule2 cannot be chained to be used as an input to Rule 1.

Simple formula and multiple-source directional declarative systems cover a wide range of applications. However, there is an important class of applications that can be addressed only by lifting the directionality restriction on the multiple-source directional declarative system. Such a system is called a constrained system.

Constrained System—

A constrained system is a type of declarative programming system having the following characteristics:

Rules describe a general relation between a set of variables

Loops can occur

Inconsistencies (infeasibilities) may occur

Any variable in the system can be set by other means (direct user input, for example)

A variable may have more than one value simultaneously.

The domain of possible values is restricted by the rules, which operate as constraints. If there are enough constraints, values for all variables will be unique. If there are too many constraints, the system becomes infeasible.

In the case where the system is under-constrained, and there are multiple possible values for one or more variables, a cost function may be introduced to indicate which is the best one.

The following set of linear equations is an example of a constrained system.

$$5X1 + 3X2 = 10$$

$$8X1 + 9X2 = 3$$

Each of the equations can be considered a rule. For this sort of system, the rule interpreter is an equation solving algorithm (LU decomposition, for example). If there are more variables than equations, and a cost function is provided, a linear programming algorithm can be used as the rule interpreter.

Systems of propositional logic clauses can be considered constrained systems. For example, the propositional sentence $$(A \lor B \lor C) \lor (D \lor A \neg B)$$

consists of a set of clauses in conjunctive normal form that constrain the values of the boolean variables. The clauses can be thought of as rules, and the rule interpreter is a propositional satisfaction algorithm like WALKSAT or DPLL. Such algorithms compute a set of values for the variables such that all the clauses are satisfied.

Constrained systems are not limited to numeric or boolean variables. Variables that have enumerated set types (a discrete set of possible values) are useful in an important class of applications. The domains of such variables can be constrained by rules. For example, in a map-coloring problem, the variables represent the colors of countries on a map, and the rules state that no two adjacent countries can have the same color. Constraint propagation algorithms of various types are used as the rule interpreters here.

Change Tracking System

Change tracking is a facility that automatically, and efficiently, detects when there are variable changes (due to procedural assignment statements), that may cause a declarative rule violation. Change tracking collects such variables, and can be used to automatically invoke the rule interpreter between procedural statements in order to ensure that the declarative rules always appear consistent to the procedural system.

A change tracking system, such as the change tracking system 56 shown in FIG. 3 above, can be based on a number of fast predicates that indicate whether, and how, a variable participates in declarative processing. These predicates can utilize hash tables generated by the rule compiler (part of the declarative processing system). The rule compiler generates the hash tables by first generating a dependency network, based on the declarative rules. The dependency network indicates input and output variables of rules. The dependency network concisely indicates variables that participate in declarative processing. The rule compiler utilizes these variables to generate the hash tables. The rule compilation process will be explained in more detail in a subsequent section.

The hash tables contain information about variables that are mentioned in rules, and how those variables are embedded within objects. The change tracking predicates use this information to determine whether a variable that has just been changed (by a procedural assignment statement) corresponds to a variable designation mentioned in a declarative rule.

Figure 6:
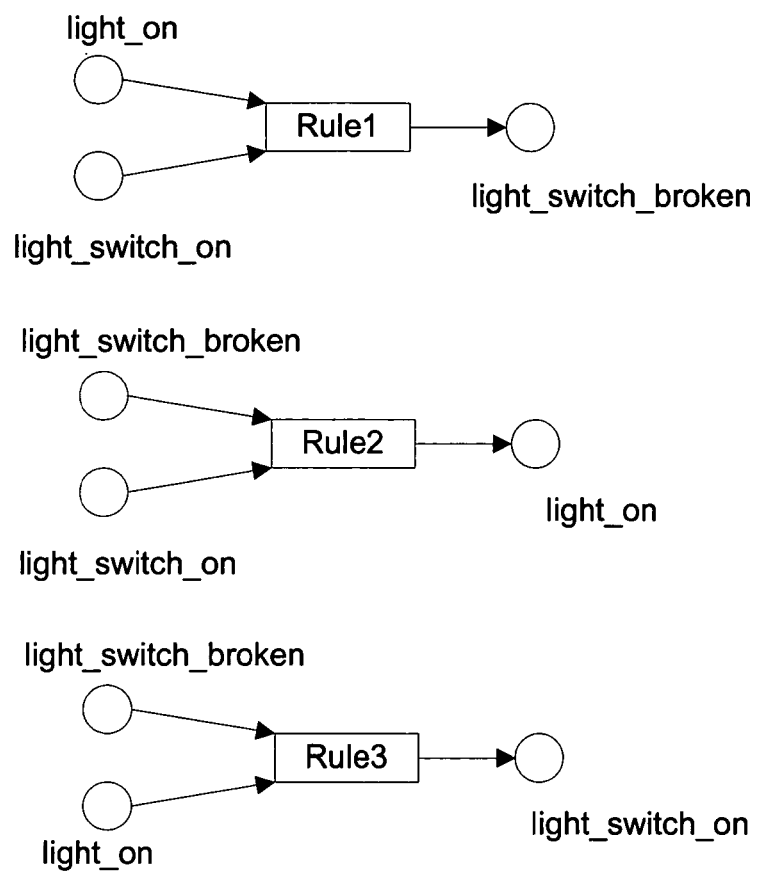
FIG. 6 shows dependency network with loop converted to DAG.
Figure 7:
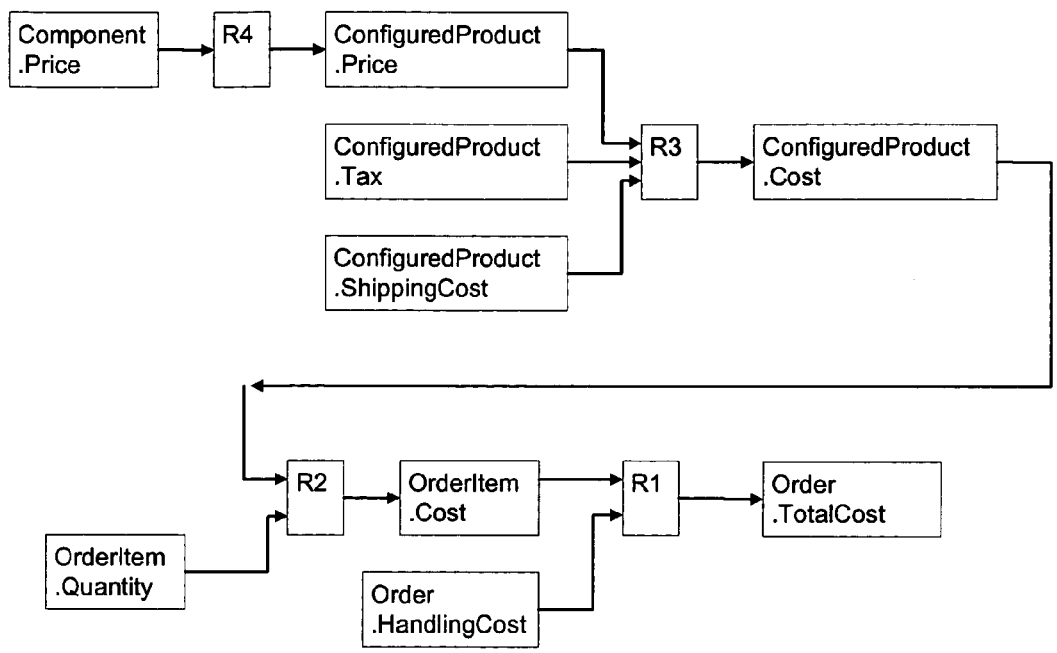
FIG. 7 shows a dependency network for an order computation example.

EXAMPLE 2 shows predicates that can be used by the change tracking system. These predicates refer to the dependency network because the dependency network indicates whether and how variables participate in declarative processing. An exemplary dependency network is shown in FIG. 7. This dependency network corresponds to an order processing example problem that has object structure shown in EXAMPLE 5, and rules shown in EXAMPLE 17 (this example will be discussed in more detail in a subsequent section). EXAMPLE 16 provides a table in which variables shown in FIG. 6 are designated by property and class of object that contains the property. EXAMPLE 3 shows hash tables that support these predicates of FIG. 5, filled in with values from the order computation example.

The change tracking system utilizes the predicate VariableDesignationInDependencyNetwork to ensure that the variable is actually in the dependency network, and to determine its location in the dependency network. However, it may first try some of the other predicates, in order to quickly rule out variables that do not match. The reason is that the other predicates are typically faster because their supporting hash tables are smaller. For example, change tracking may try the ContainingClassInDependencyNetwork predicate first, passing it the containing class for the changed variable. If this predicate returns false, there is no need to try the computationally more expensive predicate VariableDesignationInDependencyNetwork.

These predicates may be used in two ways. They may be used at run time, as part of execution of an assignment statement. For example, the execution mechanism for an assignment statement calls the change tracking system if the variable value has changed. The change tracking system checks the predicates, and if they return true, invokes the declarative rule system.

Alternatively, the compilation mechanism for the procedural system may check these predicates at compile time in order to emit appropriate code depending on the result. If the variable does not participate in declarative processing, a simple version of the assignment statement is generated, namely, one that sets the variable, and does nothing more. If, on the other hand, the variable does participate in declarative processing, a more complex version is generated, namely, one that sets the variable, checks if its value has changed, and if so, notifies the declarative rule system to propagate the change.

Note that any such compilation is invalidated if there are any changes to the rules which result in the predicate giving a different answer regarding the participation of a variable in declarative processing.

Order Computation Example

The following example involving an order processing problem illustrates an exemplary operation of the system in detail.

Consider the class definitions and instances for an order processing problem shown in EXAMPLE 5. Suppose that the declarative rules that refer to these classes are the ones shown in EXAMPLE 17. The dependency network generated by the rule compiler for this set of rules and class definitions is shown in FIG. 7.

Suppose that the variable Order-1.HandlingCost is changed by an assignment statement in the Procedural System. The Change Tracking System finds the class associated with this variable (Order), and invokes the first-level predicate to see if this class is involved in declarative processing. Since it is, the second-level predicate is invoked with the full variable designation (Order.HandlingCost). This predicate also returns a positive result. Therefore, the Change Tracking System notifies the Declarative Rule System of the change to this variable.

The Declarative Rule System locates the variable designation in the dependency network, and extracts a sub-network consisting only of Rule1 and related variables. This is the only rule that needs to be executed to make the data consistent. The rule is executed, using Order-1 to generate context, and the variable Order-1.TotalCost is updated to be consistent with the new value of Order-1.HandlingCost.

Suppose, instead, that the variable changed by an assignment statement is OrderItem-1.Quantity. Now, the sub-network extracted consists of Rule2, as well as Rule1. Rule2 is executed first, with OrderItem-1 establishing context, followed by execution of Rule1, with Order-1 establishing context.

Suppose, instead, that the changed variable is Component-1.Price. Now, the sub-network is the entire dependency network, and the rules are executed in the following sequence: Rule4, Rule3, Rule2, Rule1, with Embed-FC-Component-1 establishing context for Rule4.

Changes to several variables can be accommodated by this system as well.

Example 1

Examplary Listing of a Typical Procedural Program

```
// Compute_order computes price before tax based on product and
// quantity. It then calls compute_order_tax to compute tax based on
// which state the store where the purchase is made is in. After adding tax
// to compute total price, it computes balance after monthly payments.
int compute_order(String product, int quantity, String store_location,
      int monthly_payment, int number_of_payments)
{
  int price_before_tax, tax, total_price;
  int product_price;
  int principal, i;
  float monthly_interest;
  if (product == "flashlight")
     product_price = 500;
  else if (product == "battery")
     product_price = 100;
  price_before_tax = product_price * quantity;
  tax = compute_order_tax(price_before_tax, store_location);
  total_price = price_before_tax + tax;
  principal = total_price;
  monthly_interest = 0.005;
  for (i=1; i<=number_of_payments; ++i)
  {
     principal = round(principal +
        principal * monthly_interest - monthly_payment);
  }
  return principal;
}
int compute_order_tax(int price_without_tax, String store_location)
{
  float tax_rate;
  if (store_location == "Massachusetts")
     tax_rate = 0.06;
  else
     tax_rate = 0.05;
  return(round(price_without_tax * tax_rate));
}
```

Example 2

Predicates Used by Change Tracking System

```
Boolean PropertyInDependencyNetwork(String propertyName)
Example: PropertyInDependencyNetwork("Price")
    returns true (for dependency network in FIG. 7)
Boolean TopLevelClassInDependencyNetwork(String className)
Example: TopLevelClassInDependencyNetwork("Order")
    returns true (for dependency network in FIG. 7)
Boolean ContainingClassInDependencyNetwork(String className)
```

-continued

```
Example: ContainingClassInDependencyNetwork("ConfiguredProduct")
    returns true (for dependency network in FIG. 7)
DepNetNode
VariableDesignationInDependencyNetwork(String variableDesignation)
Example: VariableDesignationInDependencyNetwork
         (".OrderItems( ).ConfiguredProduct.Cost")
    returns node ConfiguredProduct.Cost (for dependency network
    in FIG. 7)
```

Example 3

Hash Tables that Support Change Tracking Predicates

PropertyInDependencyNetworkHash
This would contain the following values for the order computation example:
TotalCost
HandlingCost
Cost
Quantity
ShippingCost
Tax
Price
TopLevelClassInDependencyNetworkHash
This would contain the value "Order" for the order computation example. It would contain more values if there were other dependency networks.
ContainingClassInDependencyNetworkHash
This would contain the following values for the order computation example:
Order
OrderItem
ConfiguredProduct
Component
VariableDesignationInDependencyNetworkHash
This would have the following structure for the order computation example
.TotalCost
.HandlingCost
.OrderItems( )
  .Cost
  .Quantity
  .ConfiguredProduct
    .Cost
    .Price
    .Tax
    .ShippingCost
    .Components
      .Price
      .Description Example 4

Property Designation Grammar

The following grammar is used to designate a single property value.

```
PropertyDesignation -> ObjectDesignation "." PropertyNamePath
PropertyNamePath -> PropertyName
PropertyNamePath -> PropertyName "." PropertyNamePath
```

ObjectDesignation refers to an individual object. PropertyName may refer to a scalar property, to a sub-object property, or to a related object property.

The following grammar is used to designate a set of property values, or an individual element of such a set. It is based on the fact that an object property can contain a set of sub-objects, or a set of related object references.

---

CollectionPropertyDesignation -> ObjectDesignation ".".
CollectionPropertyNamePath
CollectionPropertyNamePath -> PropertyName ".".
CollectionPropertyNamePath
CollectionPropertyNamePath -> PropertyNamePath
CollectionPropertyNamePath -> CollectionPropertyName "(*).".
    CollectionPropertyNamePath
CollectionPropertyNamePath -> CollectionPropertyName "("index ").".
    CollectionPropertyNamePath

---

The "(*)" syntax is used to designate all elements of the set.

Example 5

Examplary Object Configurations and Property Designations

Class Definitions:
Order
HandlingCost (an integer variable)
TotalCost (an integer variable)
OrderItems (a collection of sub-objects of class Order-Item)
Order-Item
Cost (an integer variable)
Quantity (an integer variable)
ConfiguredProduct (a sub-object of class ConfiguredProduct)
ConfiguredProduct
Cost (an integer variable)
Price (an integer variable)
ShippingCost (an integer variable)
Tax (an integer variable)
Components (a collection of sub-objects of class Component)
Component
Price (an integer variable)
Description (a text variable)
Object instance configuration:
Order-1
.OrderItems(1)—Order-Item-1
  .ConfiguredProduct—ConfiguredProduct-1
    .Components(1)—Component-1
    .Components(2)—Component-2
    .Components(3)—Component-3
.OrderItems(2)—Order-Item-2
  .ConfiguredProduct—ConfiguredProduct-2
    .Components(1)—Component-4
    .Components(2)—Component-5
    .Components(3)—Component-6
.OrderItems(3)—Order-Item-3
  .ConfiguredProduct—ConfiguredProduct-3
    .Components(1)—Component-7
    .Components(2)—Component-8
    .Components(3)—Component-9

Example property designations using grammar from FIG. 7:

Order-1.TotalCost—refers to TotalCost integer variable scalar property of Order-1

Order-1.OrderItems(2).Cost—refers to Cost integer variable scalar property of Order-Item2

Order-1.OrderItems(*).Cost—refers to set of Cost integer variable scalar properties of set of order-item instances (Order-Item-1 Order-Item-2)

Order-1.OrderItems(2).ConfiguredProduct.Components(2).Price—refers to Price integer variable scalar property of Component

Example 6

Exemplary Object Configuration in Normalized Form

| Order | | |
|---|---|---|
| Name | HandlingCost | TotalCost |
| Order-1 | 10.00 | 4510.00 |

| Order-Item | | | | |
|---|---|---|---|---|
| Name | ParentOrder | Cost | Quantity | ConfiguredProduct |
| Order-Item-1 | Order-1 | 1500.00 | 3 | ConfiguredProduct-1 |
| Order-Item-2 | Order-1 | 2000.00 | 1 | ConfiguredProduct-2 |

| ConfiguredProduct | | | | |
|---|---|---|---|---|
| Name | Cost | Price | ShippingCost | Tax |
| ConfiguredProduct-1 | 500.00 | 400.00 | 0 | 25 |
| ConfiguredProduct-2 | 2000.00 | 1000.00 | 900.00 | 10 |

| Component | | | |
|---|---|---|---|
| Name | Parent Product | Price | Description |
| Component-1 | ConfiguredProduct-1 | 100 | 500 Mhz CPU |
| Component-2 | ConfiguredProduct-1 | 200 | Standard case, 10 Gig hard drive |
| Component-3 | ConfiguredProduct-1 | 100 | Standard sound card, speakers |
| Component-4 | ConfiguredProduct-2 | 300 | 3 Ghz CPU |
| Component-5 | ConfiguredProduct-2 | 400 | Deluxe case, 120 Gig hard drive |
| Component-6 | ConfiguredProduct-2 | 300 | Deluxe sound card, speakers |

Example 7

Exemplary Object Configuration in XML Form

```
<Orders>
    <Order>
        <name>Order-1</name>
        <HandlingCost>10.00</HandlingCost>
        <TotalCost>4510.00</TotalCost>
        <OrderItems>
            <Order-Item>
                <name>Order-Item-1</name>
                <Cost>1500.00</Cost>
                <Quantity>3</Quantity>
                <ConfiguredProduct>
                    <name>ConfiguredProduct-1</name>
                    <Cost>500.00</Cost>
                    <Price>400.00</Price>
                    <ShippingCost>0</ShippingCost>
                    <Tax>25</Tax>
                    <Components>
                        <Component>
                            <name>Component-1</name>
                            <Price>100</Price>
                            <Description>500 Mhz CPU</Description>
                        </Component>
                        <Component>
                            <name>Component-2</name>
                            <Price>200</Price>
                            <Description>Standard case, 10 Gig hard
                                drive</Description>
                        </Component>
                        <Component>
                            <name>Component-3</name>
                            <Price>100</Price>
                            <Description>Standard sound card,
                                speakers</Description>
                        </Component>
                    </Components>
                </ConfiguredProduct>
            </Order-Item>
            <Order-Item>
                <name>Order-Item-2</name>
                <Cost>2000.00</Cost>
                <Quantity>1</Quantity>
                <ConfiguredProduct>
                    <name>ConfiguredProduct-2</name>
                    <Cost>2000.00</Cost>
                    <Price>1000.00</Price>
                    <ShippingCost>900.00</ShippingCost>
                    <Tax>10</Tax>
                    <Components>
                        <Component>
                            <name>Component-4</name>
                            <Price>300</Price>
                            <Description>3 Ghz CPU</Description>
                        </Component>
                        <Component>
                            <name>Component-5</name>
                            <Price>400</Price>
                            <Description>Deluxe case, 120 Gig hard
                                drive</Description>
                        </Component>
                        <Component>
                            <name>Component-6</name>
                            <Price>300</Price>
                            <Description>Deluxe sound card,
                                speakers</Description>
                        </Component>
                    </Components>
                </ConfiguredProduct>
            </Order-Item>
        </OrderItems>
    </Order>
<Orders>
```

Example 8

Simple Declarative Rule Set for Computing Monthly Payments

Rule 1: price_before_tax=product_price*quantity
Rule 2: price=price_before_tax*tax_rate
Rule 3: monthly_payment=price/number_of_payments

Example 9

Algorithm for Computing Rule Execution List from DAG Dependency Network

```
List execution_list; // global variable
generate_execution_list(changed_variable)
{
    execution_list = ( );   // initialize to empty list
    for each node in DAG
        clear flag indicating node is in execution list;
    find_rules(changed_variable, null, ( ));
}
find_rules(variable_node, insertion_node, current_list)
{
    if ((variable_node is in execution_list) or
            (variable_node has no rules it is input to))
        // If variable node is already in the execution list, or if it is a
        leaf in the DAG
        insert_current_list(current_list, insertion_node);
    first_time = true;
    for each rule_node, rule_x, that variable_node is input to
    {
        if first_time  // if first time through this loop
            add rule_x to end of current_list;
        else
        {
            current_list = (rule_x);
            insertion_node = variable_node;
        }
        find_variables(rule_x, insertion_node, current_list);
    }
}
find_variables(rule_node, insertion_node, current_list)
{
    if (rule_node is in execution_list)
    {
        remove rule_node from current_list   // It is the last element
        insert_current_list(current_list, insertion_node);
    }
    first_time = true;
    for each variable_node, variable_x, that is output of rule_node
    {
        if first_time  // if first time through this loop
            add variable_x to end of current_list;
        else
        {
            current_list = (variable_x);
            insertion_node = rule_node;
        }
        find_rules(variable_x, insertion_node, current_list);
    }
}
insert_current_list(current_list, insertion_node)
{
    if execution_list is empty
        execution_list = current_list
    else if (insertion_node not in execution_list)
        insert current_list at beginning of execution_list
    else
        insert current_list after insertion_node in execution_list
            // insertion node is in execution list
    for each node in current_list
    {
        set flag indicating node is in execution list
    }
}
```

Example 10

Steps of algorithm for computing execution list in response to change to the tax_rate variable in FIG. 4.

---

```
generate_execution_list(tax_rate)     execution_list = ( )
  find_rules(tax_rate, null, ( ))
    find_variables(Rule_2, null (Rule_2))
      find_rules(price, null, (Rule_2 price))
        find_variables(Rule_3, null, (Rule_2 price Rule_3))
          find_rules(monthly_payment, null, (Rule_2 price Rule_3
          monthly_payment))
            execution_list = (Rule_2 price Rule_3
            monthly_payment)
```

---

Example 11

Steps of algorithm for computing execution list in response to change to the variable A in FIG. 5.

---

```
generate_execution_list(A)     execution_list = ( )
  find_rules(A, null, ( ))
    find_variables(R1, null (R1))
      find_rules(C, null, (R1 C))
        find_variables(R3, null, (R1 C R3))
          find_rules(E, null, (R1 C R3 E))
            execution_list = (R1 C R3 E)
        find_variables(R4, C, (R4))
          find_rules(F, C, (R4 F))
            execution_list = (R1 C R4 F R3 E)
    find_variables(R2, A, (R2))
```

-continued

```
      find_rules(D, A, (R2 D))
        find_variables(R4, A, (R2 D R4))
          execution_list = (R2 D R1 C R4 F R3 E)
                  // note how R1 and R2 are before R4
      find_variables(R5, D, (R5))
        find_rules(G, D, (R5 G))
          execution_list = (R2 D R5 G R1 C R4 F R3 E)
```

---

Example 12

Rule Set and Dependency Network for Multiple-Source Directional Declarative System (See FIG. 8)

Rule 1: if ((not light_on) and light_switch_on) then light_switch_broken

Rule 2: if switch_wire_loose then light_switch_broken

Example 13

Rule Interpreter Algorithm for Multiple-Source Directional Declarative Systems

---

```
List execution_list;  // global variable
List affected_variables;  // global variable
propagate_change(variable)
{
    execution_list = ( );   // initialize to empty list
    affected_variables = ( );   // initialize to empty list
    identify_affected_variables(variable);
    for each variable, var_x, in affected variables
    {
        retract_value(var_x);
        find_rules_that_compute(var_x); // Add to execution_list
    }
    execute_rules( );  // Execute rules in execution_list
}
identify_affected_variables(variable)
{
    // This algorithm is almost identical to that shown in Fig. 6. It searches forward in
    // the dependency network from variable. The main difference
    // is that instead of adding to execution_list, this adds to affected_variables.
}
retract_value(variable) {variable = unknown;}
find_rules_that_compute(variable)
{
    // This algorithm is similar to that shown in Fig. 6 except that it searches
    // backward, instead of forward, in the dependency network. Rules encountered
    // are added to execution_list in sorted form, as described in Fig. 6.
}
```

---

Example 14

Figure 9:
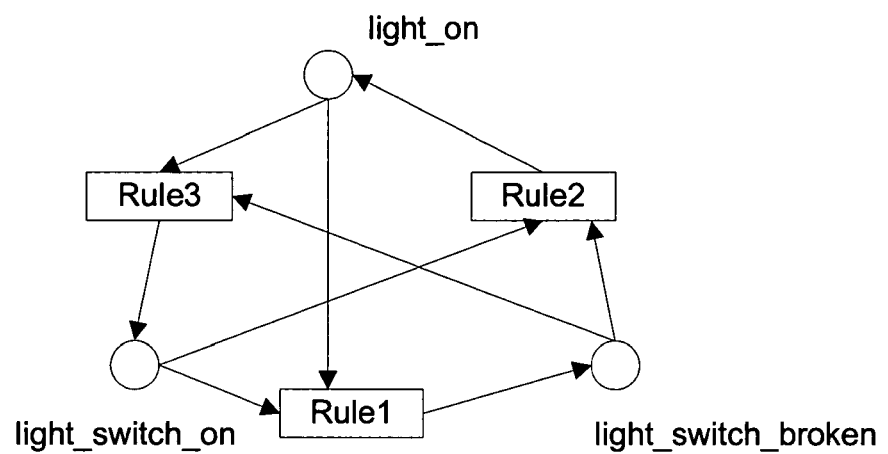
FIG. 9 shows a dependency network having loops.

Rule Set with Loop in Dependency Network (See FIG. 9)

Rule 1: if ((not light_on) and light_switch_on) then light_switch_broken

Rule 2: if (light_switch_on and (not light_switch_broken)) then light_on

Rule 3: if (light_on and (not light_switch_broken)) then light_switch_on

Example 15

Rule Grammar

```
Rule -> RuleContextDeclarations RuleBody
RuleContextDeclarations -> RuleContextDeclaration
RuleContextDeclarations -> RuleContextDeclaration RuleContextDeclarations
RuleContextDeclaration -> ClassName LocalObjectName
RuleContextDeclaration -> ClassName LocalObjectName "=" ContextObjectDesignation
ContextObjectDesignation -> LocalObjectName "." ObjectPropertyNamePath
ObjectPropertyNamePath -> ObjectPropertyName
ObjectPropertyNamePath -> ObjectPropertyName "."ObjectPropertyNamePath
// ObjectPropertyName refers to a sub-object property, or to a related object property.
RuleBody -> PropertyDesignation "=" Expression
Expression -> PropertyDesignation
Expression -> ArithmeticExpression
Expression -> LogicalExpression
Expression -> TextExpression
Expression -> "if" LogicalExpression "then" Expression
Expression -> "if" LogicalExpression "then" Expression "else" Expression
ArithmeticExpression -> NumericPropertyDesignation
ArithmeticExpression -> ArithmeticExpression ArithmeticOperator
                       ArithmeticExpression
ArithmeticExpression -> ArithmeticAggregator "(" CollectionPropertyDesignation ")"
LogicalExpression -> LogicalPropertyDesignation
LogicalExpression -> LogicalExpression LogicalOperator LogicalExpression
LogicalExpression -> ArithmeticExpression ComparisonOperator
                     ArithmeticExpression
TextExpression -> TextFunction "(" TextExpression ")"
TextExpression -> TextPropertyDesignation
ArithmeticOperator -> "+", "-", "*", etc.
ArithmeticAggregator -> "sum", "max", "min", "average", etc.
LogicalOperator -> "and", "or", "not"
// See Fig. 7 for grammar for PropertyDesignation, CollectionPropertyDesignation.
// NumericPropertyDesignation is a PropertyDesignation that refers to a numeric property
// (as opposed to a logical or text property). Similarly LogicalPropertyDesignation refers
// to a logical property, and TextPropertyDesignation refers to a text property.
Example rule using this grammar (see also Example 17)
Order Order1
OrderItem OrderItem1 = Order1.OrderItems(*)
OrderItem1.Cost = OrderItem1.Quantity * OrderItem1.ConfiguredProduct.Cost
Local object names Order1 and OrderItem1 are declared in the rule context declarations
section. This specifies a pattern of an OrderItem object (OrderItem1) that is referred to in
the OrderItems property of an Order object (Order1). Thus, the rule can be executed only
if the retrieved context, beginning with the focus object, fits this pattern.
Another example rule
OrderItem OrderItem1
ConfiguredProduct ConfiguredProduct1 = OrderItem1.ConfiguredProduct
Local object names OrderItem1 and ConfiguredProduct1 are declared in the rule context
declarations section. This specifies a pattern of a ConfiguredProduct object
(ConfiguredProduct1) that is referred to in the ConfiguredProduct property of an
OrderItem object (OrderItem1).
```

Example 16

Table below shows variables shown in FIG. 7 designated by property and class of object that contains the property (see also EXAMPLE 4). Full variable designation information is shown in the following table.

| Containing class and property | Full variable designation (from top-level object) |
|---|---|
| Order.TotalCost | .TotalCost |
| Order.HandlingCost | .HandlingCost |
| OrderItem.Cost | .OrderItems( ).Cost |
| OrderItem.Quantity | .OrderItems( ).Quantity |
| ConfiguredProduct.Cost | .OrderItems( ).ConfiguredProduct.Cost |
| ConfiguredProduct.Tax | .OrderItems( ).ConfiguredProduct.Tax |
| ConfiguredProduct.ShippingCost | .OrderItems( ).ConfiguredProduct.ShippingCost |
| Component.Price | .OrderItems( ).ConfiguredProduct.Components( ).Price |

Example 17

Rules for Order Processing Example

```
Order
Rule1
.TotalCost=.HandlingCost+sum(.OrderItems( ).Cost)
OrderItem
Rule2
.Cost=.Quantity*.ConfiguredProduct.Cost
ConfiguredProduct
Rule3
.Cost=.Price*(1+.Tax/100)+.ShippingCost
Rule4
.Price=sum(.Components( ).Price)
```

Those having ordinary skill in the art will appreciate that various changes can be made to the above embodiments without departing from the scope of the invention.

In view thereof, what we claim is:

1. A method of unifying one or more declarative rules and a plurality of procedural instructions in a procedural computational system the method comprising the steps of:
   upon execution of a procedural instruction that changes one or more variables, updating one or more other variables participating in one or more declarative rules so as to maintain relationships imposed by said one or more rules among said variables,
   wherein said updating of said one or more other variables is performed prior to execution of other procedural instructions.

2. The method of claim 1, wherein said declarative rules are provided as textual expressions.

3. The method of claim 1, wherein said declarative rules are expressed in a tabular form.

4. The method of claim 3, further comprising parsing said tabular form for generating rule execution code.

5. The method of claim 1, wherein said declarative rules are expressed as procedures having defined inputs and outputs.

6. The method of claim 1, further comprising characterizing said declarative rules by a dependency network.

7. The method of claim 1, wherein said declarative rules form a simple formula declarative system.

8. The method of claim 1, wherein said declarative rules form a multi-source directional declarative system.

9. The method of claim 1, wherein said one or more declarative rules comprise a constrained declarative system.

10. The method of claim 1, further comprising saving said modified variables to a persistent storage.

11. The method of claim 1, further comprising ascertaining a type of declarative system formed by said one or more declarative rules.

12. The method of claim 1, comprising determining whether said one or more variables participate in at least one of said declarative rules by employing a hash table indexed by variable name.

13. A method of unifying one or more declarative rules and a procedural computational system supporting object-oriented representation of data, the method comprising the steps of:
   upon execution of a procedural instruction that changes one or more data in an object, updating one or more other data participating in one or more declarative rules, where said one or more other data are in said object and/or in other objects, so as to maintain relationships imposed by said one or more declarative rules among said data,
   wherein updating of said one or more other data is performed prior to execution of other procedural instructions.

14. The method of claim 13, further comprising ascertaining a type of declarative system formed by said one or more declarative rules.

15. The method of claim 13, comprising determining whether a said data associated with a said object participates in a said declarative rule at runtime subsequent to assignment of a value to that data.

16. The method of claim 13, further comprising loading any selected data corresponding to said object on which a procedural instruction is operated and data corresponding to said other objects from a persistent storage.

17. The method of claim 13, wherein said one or more declarative rules specify patterns of objects related by said rules.

18. The method of claim 13, wherein said one or more declarative rules are provided as textual expressions.

19. The method of claim 13, wherein said one or more declarative rules are expressed in a tabular form, with the table columns (or rows) representing properties of related objects, and table rows (or columns) representing different values, or ranges of values.

20. The method of claim 13, further comprising computing an object property based on other properties in said object and/or based on properties in related objects.

21. The method of claim 13, wherein said one or more declarative rules are expressed as procedures having defined inputs and outputs, the inputs and outputs being properties of related objects.

22. The method of claim 13, further comprising characterizing said one or more declarative rules by a dependency network, where the variables in the network are properties of objects.

23. The method of claim 13, wherein said one or more declarative rules form a simple formula declarative system.

24. The method of claim 13, wherein said one or more declarative rules comprise a multi-source directional declarative system.

25. The method of claim 13, wherein said one or more declarative rules comprise a constrained declarative system.

26. The method of claim 13, further comprising ascertaining a type of declarative system formed by said one or more declarative rules.

27. A method of unifying one or more declarative rules and a procedural computational system, the method comprising the steps of:
   compiling a procedural instruction for assignment of a value to a variable so as to effect, upon execution of such instruction at runtime, updating of one or more other variables participating in one or more declarative rules so as to maintain consistency of relationships imposed by said one or more declarative rules among said variable to which such value is assigned and said one or more other variables, wherein that updating of the one or more other variables is performed prior to execution of other procedural instructions.

28. An integrated computational system, comprising
   one or more digital data processors that execute
   a procedural facility for executing procedural instructions operating on one or more variables,
   a declarative facility coupled to operate on at least selected one of said variables so as to maintain one or more relationships among participating variables defined by one or more declarative rules, and
   a change tracking facility in communication with said procedural and declarative facilities,
   wherein upon execution of said procedural instructions, said change tracking facility detects changes, if any, in one or more variables participating in at least one of said declarative rules and reports one or more said changes to said declarative facility, said declarative facility updating one or more other variables participating in said at least one declarative rule, in response to said reported change, so as to maintain a relationship defined thereby, wherein that updating of the one or more other variables is performed prior to execution of other procedural instructions.

29. The computational system of claim 28, wherein said declarative module comprises a rule compiler operating on a textual representation of said one or more declarative rules to generate a rule execution code and a dependency network characterizing said rules.

30. The computational system of claim 29, wherein said rule compiler generates hash tables indexed by variable names and variable designations that specify chains of related objects and their properties.

31. A method of unifying one or more declarative rules and a procedural computational system so as to render a plurality of instructions provided by said procedural system and a plurality of declarative rules mutually consistent, the method comprising the steps of:
- upon execution of a procedural instruction modifying one or more variables,
- executing one or more declarative rules to update values of one or more other variables participating in said one or more rules,
- wherein said updating of values of other variables is deferred until at least one of said procedural instructions requires those one or more other variables.

* * * * *